United States Patent
Beamish

(10) Patent No.: US 6,766,162 B1
(45) Date of Patent: Jul. 20, 2004

(54) MESSAGE NOTIFICATION SYSTEM FOR WIRELESS COMMUNICATION SYSTEM

(75) Inventor: Norman J. Beamish, Costa Mesa, CA (US)

(73) Assignee: Skyworks Solutions, Inc., Irvine, CA (US)

(*) Notice: Subject to any disclaimer, the term of this patent is extended or adjusted under 35 U.S.C. 154(b) by 0 days.

(21) Appl. No.: 09/299,202

(22) Filed: Apr. 23, 1999

(51) Int. Cl.[7] .......................... H04M 11/10; G08B 5/22; H04Q 1/30; H04Q 7/00; G09G 5/00

(52) U.S. Cl. ................. 455/412.1; 455/413; 455/456.1; 455/475; 455/466; 340/7.55; 345/781; 370/332; 370/328; 370/311; 375/145; 375/222; 379/38; 379/106.02

(58) Field of Search .............................. 455/413, 415, 455/461, 412, 466, 425, 456; 370/328, 332, 311; 709/217; 375/206, 745, 328, 222; 379/106.02, 38; 340/7.55; 345/781

(56) References Cited

U.S. PATENT DOCUMENTS

| | | | |
|---|---|---|---|
| 4,700,375 A | * 10/1987 | Reed | |
| 4,748,685 A | * 5/1988 | Rozanski et al. | |
| 4,751,726 A | * 6/1988 | Hepp et al. | ............ 379/106.02 |
| 4,873,711 A | * 10/1989 | Roberts et al. | |
| 5,228,449 A | * 7/1993 | Christ et al. | ................... 379/38 |
| 5,327,493 A | 7/1994 | Richmond et al. | |
| 5,457,680 A | * 10/1995 | Kamm et al. | ................ 370/332 |
| 5,488,631 A | * 1/1996 | Gold et al. | .................. 375/145 |
| 5,802,466 A | * 9/1998 | Gallant et al. | |
| 5,825,852 A | 10/1998 | DePond et al. | |
| 5,966,663 A | * 10/1999 | Gleason | ....................... 455/466 |
| 6,006,087 A | * 12/1999 | Amin | .......................... 455/413 |
| 6,014,559 A | * 1/2000 | Amin | .......................... 455/413 |
| 6,072,784 A | * 6/2000 | Agarwal et al. | ............. 370/311 |
| 6,208,627 B1 | * 3/2001 | Menon et al. | .............. 370/328 |
| 6,230,007 B1 | * 5/2001 | Archambeault | ............. 455/425 |
| 6,292,665 B1 | * 9/2001 | Hildebrand et al. | ......... 455/456 |
| 6,317,781 B1 | * 11/2001 | De Boor et al. | ............ 345/781 |
| 6,366,609 B1 | * 4/2002 | Rossi | .......................... 375/222 |

FOREIGN PATENT DOCUMENTS

| JP | 6-291831 | * 10/1994 |
|---|---|---|
| JP | 11-98552 | * 11/2002 |

OTHER PUBLICATIONS

Newton, Harry, "Newton's Telecom Dictionary", 8th edition, 1994, p. 505.*

Nokia, "NOKIA 5165", pp. 44–45, , Aug. 2000.*

* cited by examiner

Primary Examiner—William Cumming
(74) Attorney, Agent, or Firm—Farjami & FarJami LLP

(57) ABSTRACT

A method and apparatus for indicating message status in a wireless communication system comprising a base station configured to communicate with at least one mobile unit over a wireless interface. The mobile unit includes an indicator having first and second human perceptible states, with the first state indicating a lack of message waiting condition, and the second state indicating a message waiting condition. The base station monitors communications from a messaging system. When a communication is received indicating message status or a change in message status, the base station transmits a command regarding message status to the mobile unit over the wireless interface. In response, the mobile unit maintains or changes the state of the indicator to reflect the message status as determined by the command.

8 Claims, 20 Drawing Sheets

MESSAGE NOTIFICATION SYSTEM FOR WIRELESS COMMUNICATION SYSTEM

BACKGROUND OF THE INVENTION

1. Field of the Invention

This invention relates generally to message waiting indicators for communication systems and in particular to a message waiting indicator system for detecting and reporting message waiting conditions in a wireless communications system.

2. Background

Electronic telephone message recording devices (message machines) have become common place in households and businesses throughout the world. These devices allow a caller to leave a voice message if the call recipient is not in, or is unable or unwilling to answer the call. Early message machines were stand alone units located in the home or business. More recently, local telephone service providers (LTSP) have begun offering electronic voice mail service to their customers. Obtaining voice messaging services from a LTSP provides several advantages to a subscriber, including remote message retrieval, permanent message storage and reduced equipment maintenance. Most often, the voice mail system is located and accessed at the central office of a LTSP.

A voice mail system operates by monitoring the telephone lines that are linked or associated with a voice mail service. When one of these lines receives a call, the voice mail system monitors the line to determine if the line is not answered or if the line is in use. If the line is not answered or is in use at the time of the incoming call the voice mail system forwards the incoming call to a message recorder so that the caller may leave a message for the unavailable call recipient. A call-in password restricted message retrieval system allows a properly authenticated voice mail service subscriber to retrieve stored messages.

To notify the subscriber of messages, the subscriber's voice mail service most often transmits a short period of stuttered dial tone when the line associated with the service initially assumes an off-hook status. If a user retrieves messages from a line not associated with the subscriber's voice mail service, the voice mail service reveals the number of new messages, if any, to the user using recorded or synthesized voice prompts.

Traditional stutter dial tone message notification requires a voice mail subscriber to physically take the telephone off-hook and listen for the stutter dial tone to determine if new messages have arrived. This is inconvenient because the subscriber must physically go to the telephone, lift the handset and listen for stutter dial tone. Moreover, in the case of those having hearing impairments, stutter dial tone may be undetectable. In U.S. Pat. Nos. 5,825,852 and 5,327,493, both of which are hereby fully incorporated by reference herein as though set forth in full, techniques are described for detecting the stutter dial tone while the telephone is in an on-hook condition, and, in response thereto, providing a visual indication of the message waiting condition. These techniques overcome at least some of the disadvantages of the traditional stutter dial tone technique.

Visual Message Waiting Indicator (VMWI) detection, defined by a specification known as CLASS (Custom Local Area Signaling Services), is a second technique for detecting message waiting conditions. The VMWI circuitry interrogates the line from the LTSP and, upon detection of a FSK (frequency shift key) formatted message indicating a message waiting condition, activates a visual indicator, such as an LED. U.S. Pat. No. 5,825,852 provides additional details about this technique.

Dual mode systems, as described in U.S. Pat. No. 5,825,852, are also available for detecting and indicating a message waiting condition in response to on-hook stutter dial tone detection or VMWI detection.

A problem with all the foregoing systems and techniques is that they are configured for use in landline systems only, and are not applicable to wireless communication systems.

Therefore, a need exists for a voice message notification system tailored for use in a wireless communication system, such as a cordless phone system.

SUMMARY OF THE INVENTION

In accordance with the purpose of the invention as broadly described herein, there is provided a message indicator system for use in a wireless communication environment comprising a base station in communication with a mail messaging system and one or more mobile units serviced by and interfaced to the base station over a wireless interface.

According to a first embodiment, at least one of the mobile units is equipped with a message indicator, which is any human perceptible indicator capable of providing a visual, aural, tactile, olfactory, or other stimulus to a human. In one implementation, the message indicator is a flashing light-emitting diode (LED). Optionally, the base station is also equipped with a message indicator.

A message status signal detection system is provided in the base station. This system monitors for communications from a mail system indicating status, or a change in status, regarding a message waiting condition. Examples include signals indicating receipt of a new message, the presence of an unread message, and the handling of a previously unread message. The system includes dual mode detection comprising stutter dial tone detection and FSK signal monitoring.

A wireless control channel is provided between the base station and the mobile unit. In one implementation, the control channel is configured in parallel with one or more voice channels, and is capable of supporting communication of control information between the base station and the mobile unit while voice communication is underway.

The message indicator is configured with first and second states for indicating respectively the presence and absence of a message waiting condition. In one implementation, the indicator is a flashing LED having a first activated state for indicating a message-waiting condition, and a second deactivated state for indicating the absence of a message waiting condition.

When a communication from the mail system is received relating to mail message status, the system activates an indicator at the base station if such is present. In one implementation, the base station then broadcasts a message to the mobile unit advising it of the status and directing it to update its indicator to reflect, or ensure that it reflects, the proper status. In response thereto, the mobile unit, if within range, i.e. able to receive the signal, updates the status of its indicator accordingly or ensures that its indicator reflects the proper status. If the mobile unit is not within range, it is not updated with the current status. The notation "within range" defines a relationship between the base station and the mobile unit such that they are able to communication. Examples of when a base station and a mobile unit are not within range includes but is not limited to instances when obstructions when the base or mobile are not on or powered up, block signal transmission, low or dead battery condition, electrical or magnetic interference, the mobile too far away from the base, the base is not provided with power, the antenna is not fully extended and the like.

In a second implementation, the base station monitors the control channel for receipt of a heartbeat signal indicating that the mobile unit is within range and transmitting the heartbeat. Upon receipt of the heartbeat signal, the base station communicates a message to the mobile unit over the control channel advising the mobile unit to update the indicator at the mobile unit or ensure that it reflects the correct status.

If the base station does not detect a heartbeat signal, indicating that the mobile is out of range, the base station stores the desired communication in a buffer. When the base station detects the heartbeat signal, it then retrieves the desired communication from the buffer, and transmits it to the mobile over the control channel. At that point, the mobile is instructed to activate its indicator.

When the message has been handled, the messaging system notifies the base station, and the base station, in response thereto, sends a command to the mobile unit to update its indicator accordingly. More specifically, upon receipt of a heartbeat signal from the mobile, the base station transmits a communication to the mobile unit over the control channel, advising the mobile unit to deactivate the indicator. If the base station does not detect the heartbeat signal within the prescribed time, the base station buffers the communication, and transmits it to the mobile once the heartbeat signal is detected.

In a second embodiment, each of the plurality of mobile units serviced by the base station is configured with an indicator. A messaging system indicates to the base station a message status condition intended only for selected ones of the plurality of mobile units. The base station is configured to address a communication over the control channel to the selected mobile units advising these units to update their indicators to reflect the status condition. In one implementation, messages from the base station over the control channel have address information appended thereto for indicating the selected mobile units to which the communication is intended. The mobile units are each configured to process only those communications received over the control channel that are addressed to that mobile unit, and to ignore other communications over the control channel.

In one implementation, a plurality of mail messaging systems are interfaced to the base station, each for saving messages for selected ones of the mobile units serviced by the base station. The base station, upon receipt of a communication from one of these mail messaging systems regarding a message status condition, addresses the communication only to the selected mobile units that are the intended recipients of the communication. The status condition is then reflected in the indicators for the selected mobile units, and not for the other mobile units serviced by the base station.

In a third embodiment, a base station is in communication with at least one message notification unit over a wireless interface. The message notification unit is configured to communicate with the base station over the control channel only, and is not configured to communicate with the base station over a voice channel. The message notification unit is configured with an indicator for indicating the status of a mail message condition. The base station receives from the mail messaging system a communication indicating the status, or a change in status, of a mail message condition. The base station communicates this information to the message notification unit over the control channel. In response thereto, the message notification unit places the indicator in the proper state to indicate the current message waiting status.

Message notification units have the advantages of portability and low cost of manufacture in relation to a mobile unit configured with voice communication capabilities.

DETAILED DESCRIPTION OF THE PREFERRED EMBODIMENTS

1. Description of First Embodiment in the Context of an Example Environment

Figure 1:
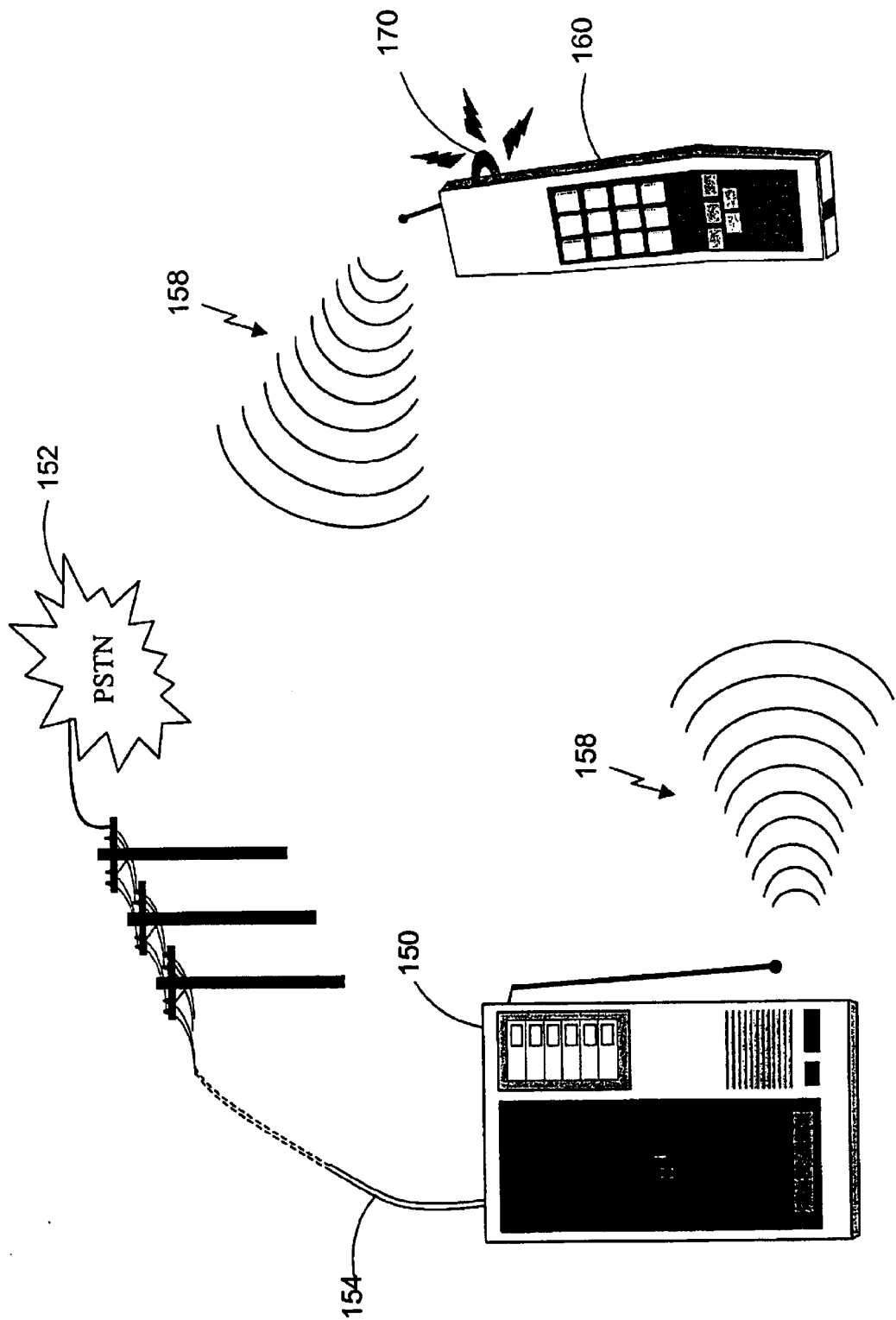
FIG. 1 illustrates an example environment of the subject invention.

FIGS. 1 and the associated text provides an overview of a first embodiment of the invention in the context of an example environment comprising a cordless telephone system as is commonly found in homes and businesses. As shown, a base station 150 is in communication with a mail messaging system (not shown), maintained by an LTSP on the Public Switched Telephone Network (PSTN) 152, and accessible over line 154. In addition, the base station is in communication with one or more mobile units 160 serviced by and interfaced to the base station 150 over a wireless interface.

According to a first embodiment, at least one of the mobile units 160 is equipped with a message indicator 170, which is any human perceptible indicator capable of providing a visual, aural, tactile, olfactory, or other stimulus to a human. In one implementation, the message indicator is a flashing light-emitting diode (LED). Optionally, the base station 150 is also equipped with a message indicator (not shown).

A message status signal detection system is provided in the base station. This system monitors for communications from the mail system indicating status, or a change in status, regarding a message waiting condition. Examples include messages indicating receipt of a new message, the presence of an unread message, and the handling of a previously-unread message. The system includes dual mode detection comprising stutter dial tone detection and FSK signal monitoring.

A control channel is provided as part of the wireless interface between the base station 150 and the mobile unit 160. In one implementation, the control channel is configured in parallel with one or more voice channels that allow the communication of voice between the base station 150 and mobile unit 160. The control channel is configured to support communication of control information between the base station 150 and the mobile unit 160 while voice communication is underway between the two.

The message indicator is configured with first and second states for indicating respectively the presence and absence of a message waiting condition. In one implementation, the indicator is a flashing LED having a first activated state for indicating a message-waiting condition, and a second deactivated state for indicating the absence of a message waiting condition.

When a communication from the mail system is received relating to mail message status, the system activates an indicator at the base station 150 if such is present. In one implementation, the base station 150 then broadcasts a message to the mobile unit 160 advising it of the status and directing it to ensure that its indicator 170 reflects the proper status. Such is identified with numeral 158 in FIG. 1. In response thereto, the mobile unit 160, if within range, ensures that its indicator 170 reflects the proper status. If the mobile unit is not within range or able to receive, it is not updated with the current status.

In a second implementation, the base station 150 monitors the control channel for receipt of a heartbeat signal 158 indicating that the mobile unit 160 is on and within range. Upon receipt of the heartbeat signal 158, the base station 150 communicates a message to the mobile unit 160 over the control channel advising the mobile unit 160 to ensure that its indicator 170 reflects the correct status.

If the base station 150 does not detect a heartbeat signal, indicating that the mobile 160 is out of range, the base station 150 stores the desired communication in a buffer (not shown). When the base station 150 detects the heartbeat signal, it then retrieves the desired communication from the buffer, and transmits it to the mobile 160 over the control channel. At that point, the mobile 160 is instructed to ensure that its indicator 170 reflects the correct status.

2. Implementation of First Embodiment

Figure 11:
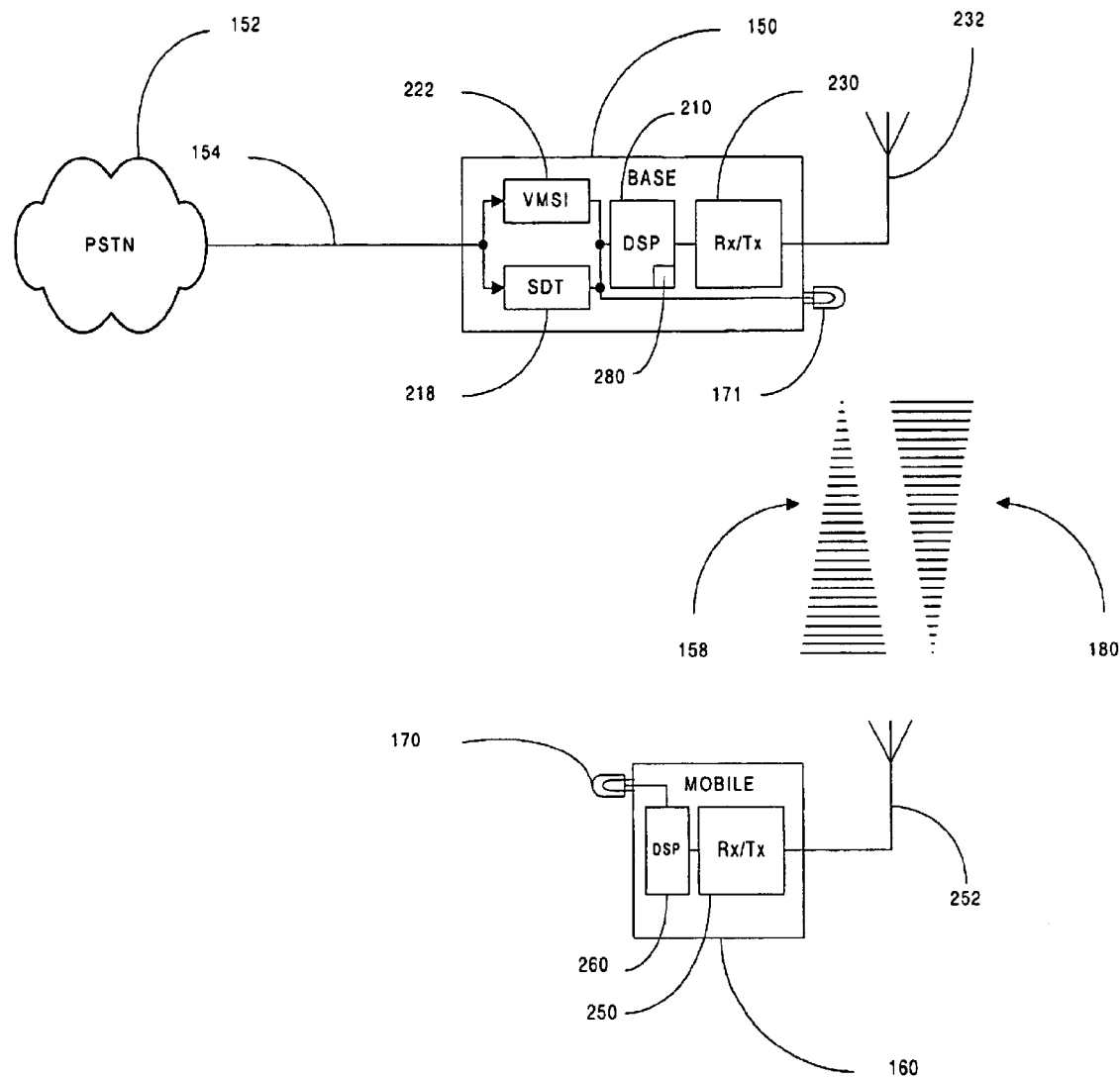
FIG. 11 is a block diagram of the base station and mobile unit in one implementation of the invention.

FIG. 11 illustrates one implementation of the first embodiment. Compared to FIG. 1, like elements in FIG. 11 are referenced with like identifying numerals. The additional elements illustrated in FIG. 11 which are part of base station 150 include VMWI CLASS detector 222, stutter dial tone (SDT) detector 218, receiver/transmitter 230, digital signal processor 210, and indicator 171.

The VMWI detector 222 is configured to monitor line 154 for CLASS FSK messages indicating the status, or change in status, regarding pending mail messages. The SDT detector 218 is configured to simulate an off-hook condition, and thereafter detect a stutter dial tone, or lack thereof, to determine the status of pending mail messages.

The DSP 210 is configured to function as an overall controller for the base station. In relation to FIG. 11, DSP 280 receives the outputs of the VMWI detector 222 and the SDT detector 218, and, in response thereto, determine the message waiting status for the base station/mobile unit combination. DSP 210 includes a buffer 280 for the buffering of information to be transmitted to the mobile unit 160 regarding message waiting status. An optional indicator 171 is provided at the base station 150 for indicating the status of the message waiting condition.

The receiver/transmitter 230 is configured to transmit and receive control or voice information over the wireless interface with mobile unit 160. Both voice and control channels are provided so that the communication of control information over the wireless interface can take place in parallel with the communication of voice information over the wireless interface. FIG. 11 illustrates the transmission of control information 158 over the wireless interface from the base station 150 to the mobile unit 160 in parallel with the communication of voice information 180 from the mobile unit to the base station 160.

The additional elements which are illustrated in FIG. 11 and are part of mobile unit. 160 include receiver/transmitter 250 and DSP 260. The receiver/transmitter 250 is configured to receive and transmit control and voice information over the wireless interface. Again, control and voice channels are provided so that communication of control information with the base station can take place in parallel with the communication of voice information with the base station.

The DSP 260 is configured to receive and implement commands received over the control channel from the base station in relation to message status. In response to such messages, the DSP 260 ensures that the state of indicator 170 reflects the current message status.

Figure 9:
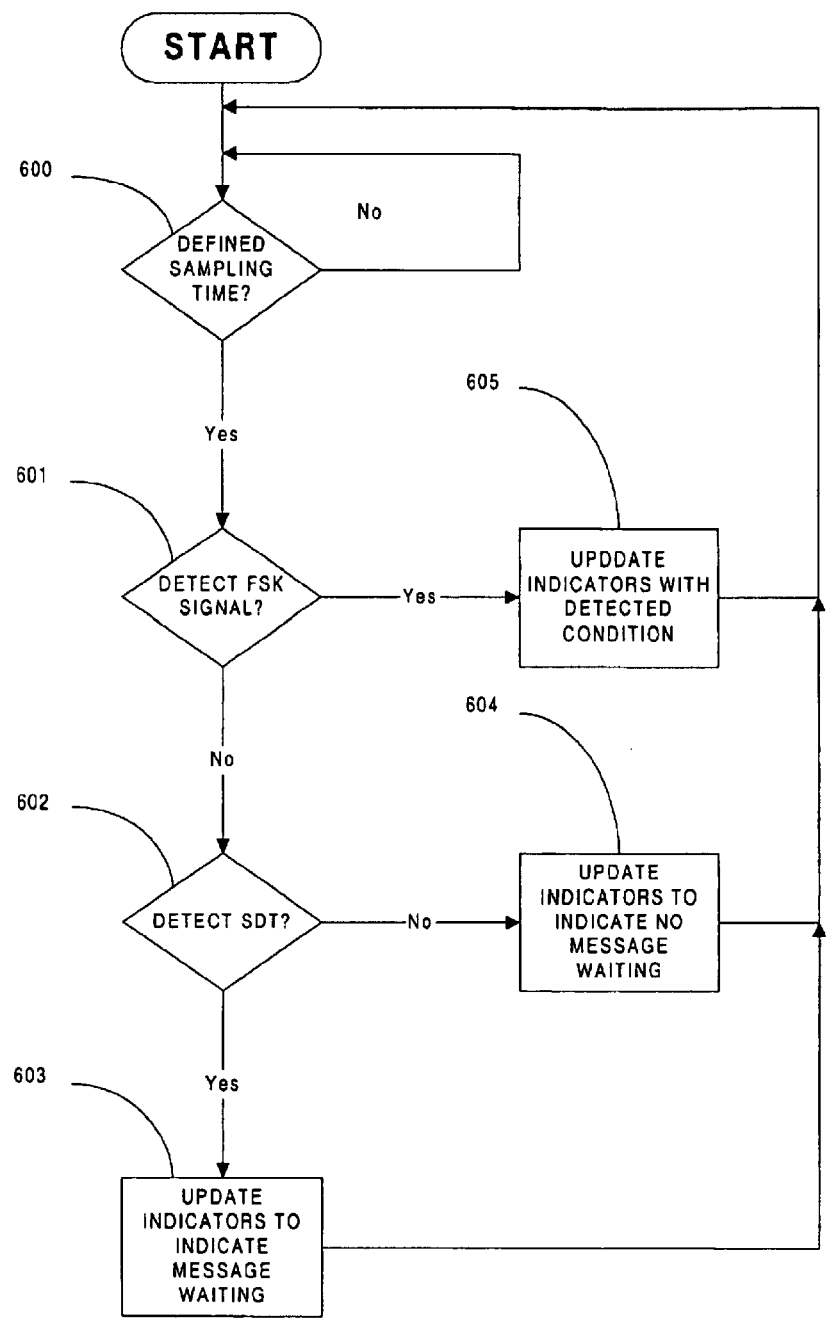
FIG. 9 is a flowchart depicting a method of operation of one implementation of the subject invention.

FIG. 9 illustrates a method of operation of the foregoing implementation of the first embodiment. In step 600, a determination is made whether the current time is an appropriate sampling period for detecting the status of waiting messages. If not, the method loops back to the beginning of step 600. If so, the method proceeds to step 601. In one implementation example, the status of waiting messages is sampled periodically. In another example, the status of waiting messages is sampled only in response to particular events, such as completion of a call, or an unanswered call, which typically precede changes in message status.

If the current time is not an appropriate sampling period, the method loops back to the beginning of step 600. If the current time is an appropriate sampling period, step 601 is performed.

In step 601, the method determines whether a VMWI CLASS FSK signal has been detected. A typical example of a VMWI CLASS FSK signal comprises a 300 ms channel seizure signal and a 150 ms signal comprising a mark signal and a data signal. This is but one possible example of detection. It is contemplated that other detection methods may be utilized. Together, the channel seizure signal and mark signal constitutes the preamble of the FSK signal. The data bit field contains information regarding voicemail waiting conditions, including a new voicemail message, a pending voicemail message, a recently handled voicemail message, or other desired data.

If a valid VMWI CLASS FSK signal is detected, step 605 is performed. In step 605, the VMWI CLASS FSK signal is decoded and implemented. To implement the signal, the method determines the current message waiting status responsive to and indicated by the signal, and ensures that the indicator of the base unit, if one is present, reflects the current status as determined by the signal. Then, if the mobile unit is within range or able to receive a signal, the current status is communicated to the mobile over the wireless interface, and the indicator is either changed or maintained so that it reflects the current status as determined by the received FSK signal. If the mobile is out of range, the current status is buffered and then, if not overwritten by updated status information, communicated to the mobile when the mobile is within range. The method then jumps to the beginning of step 600.

If a valid VMWI CLASS FSK signal is not detected in step 601, step 602 is performed. In step 602, the method simulates an off-hook condition, and thereafter determines if a stutter dial tone is induced in response to the simulated off-hook condition. If so, step 603 is performed. In step 603, the indicator at the base unit (if present) and the indicator at the mobile unit are either updated or maintained to ensure that they reflect a message waiting condition. Again, if the mobile is out of range, the status information is buffered and, if not overwritten, communicated to the mobile at the appropriate time. The method then jumps to the beginning of step 600.

If a stutter dial tone is not detected in step 602, step 604 is performed. In step 604, the indicators are either updated or maintained to ensure that they reflect a no message waiting condition. Again, if the mobile out of range or unable to receive the signal, the status information is buffered, and communicated to the mobile at the appropriate time (if not overwritten). Then, the method jumps to the beginning of step 600.

3. Typical Operating Scenario

Figure 10A:
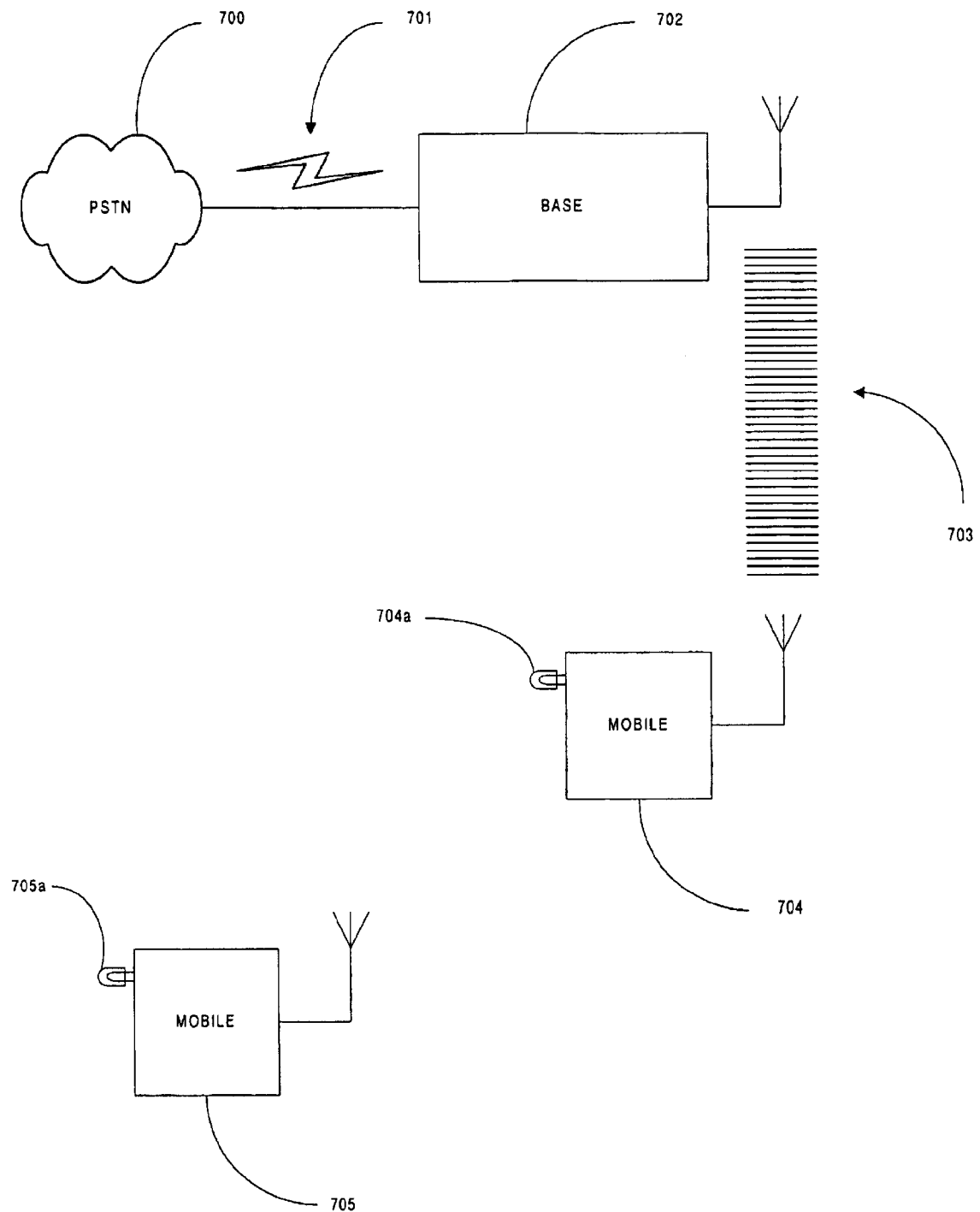
FIGS. 10A–10J illustrate a typical operating scenario for the subject invention.

FIGS. 10A–10J illustrates a typical operating scenario for one implementation of the first embodiment. As illustrated in FIG. 10A, a base unit 702 is in communication with the mobile unit 704 over a wireless interface. Information pertaining to the wireless system performance is interchanged between mobile unit 704 and base unit 702 on a control channel and voice information, identified by numeral 703, may be communicated back and forth between the base station 702 and the mobile unit 704. An example of this manner of operation is during intercom mode or if embodied in a two-line device. The communication of this voice information is through a voice channel existing in the wireless interface. The base unit in this scenario lacks a message waiting indicator, but the mobile unit has such an indicator. The indicator for the mobile unit is identified by numeral 704*a*.

A second mobile unit 705 is also being serviced by the base station 702. It is assumed that the mobile unit 704 is receiving and within range of the base station, but that mobile unit 705 is outside the range of the base unit 702. The indicator for mobile unit 705 is identified by numeral 705*a*.

The base station 702 is interfaced to a messaging system (not shown) maintained on the PSTN 700. The scenario begins when a communication, identified by numeral 701, is received from the messaging system indicating a message waiting condition.

Figure 10B:
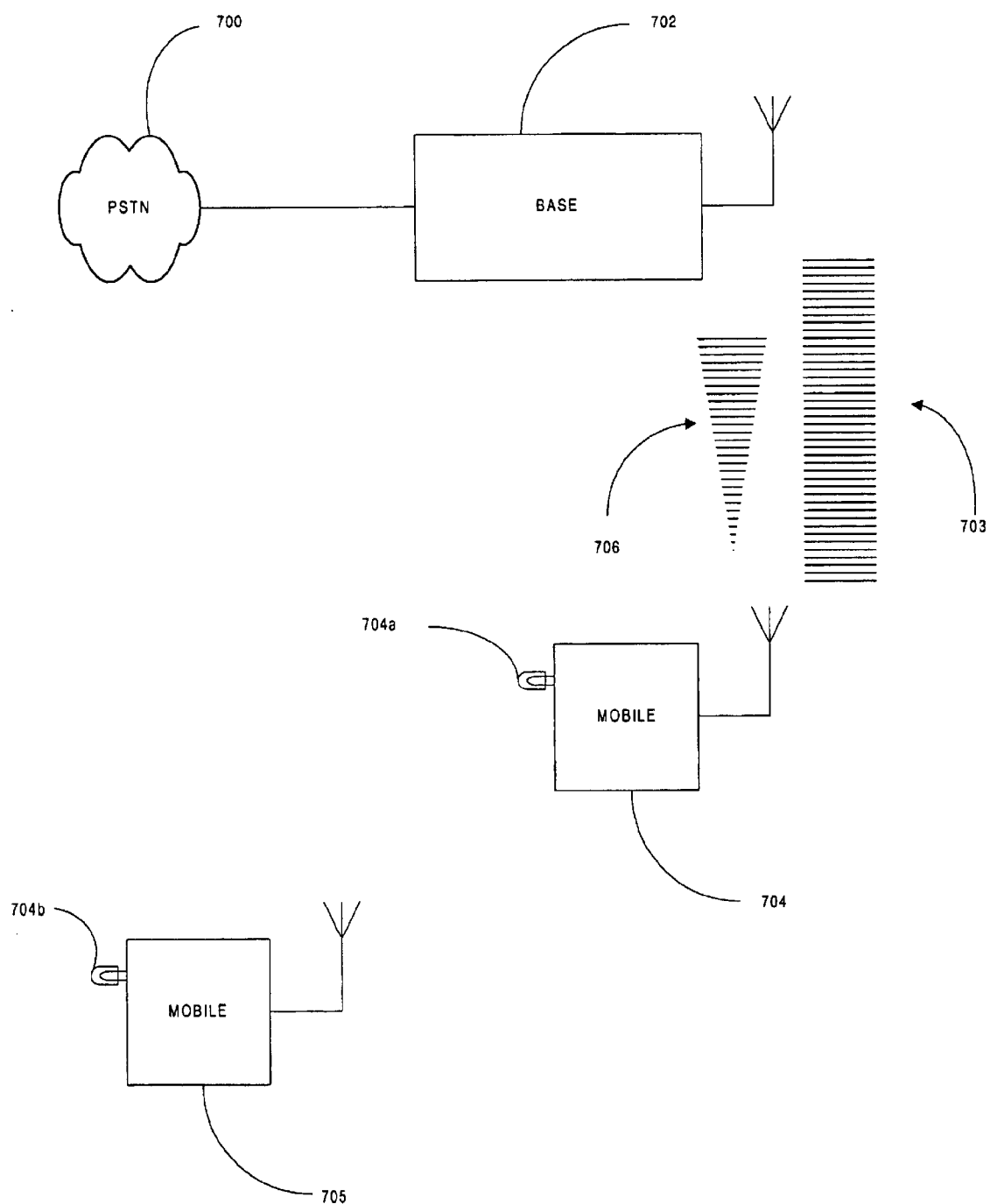

As illustrated in FIG. 10B, the base unit 702 next determines which mobile units are within range as determined by a heartbeat signal periodically transmitted from the mobile to: the base station over the control channel. Since mobile unit 704 is within range, a heartbeat signal, identified by numeral 706, is received by the base station from mobile unit 704. Such a signal is not received from mobile 705.

Figure 10C:
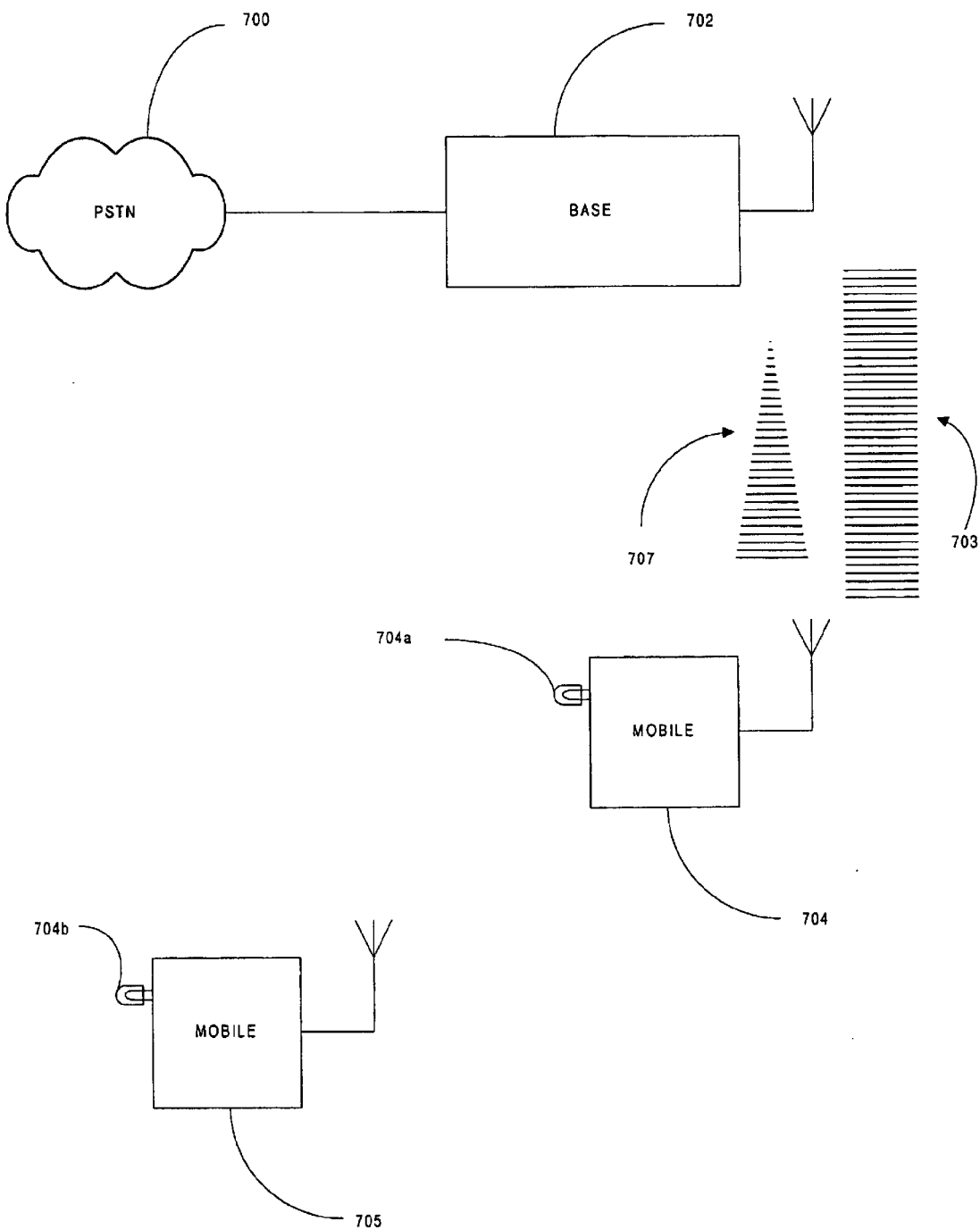

As illustrated in FIG. 10C, in response to receiving the heartbeat signal from mobile 704, the base station 702 transmits a signal 707 over the control channel directing the mobile 704 to activate its indicator 704*a* to indicate a message waiting condition. The communication is over the control channel, and occurs while a communication 703 between the base and mobile over the voice channel may be ongoing.

Figure 10D:
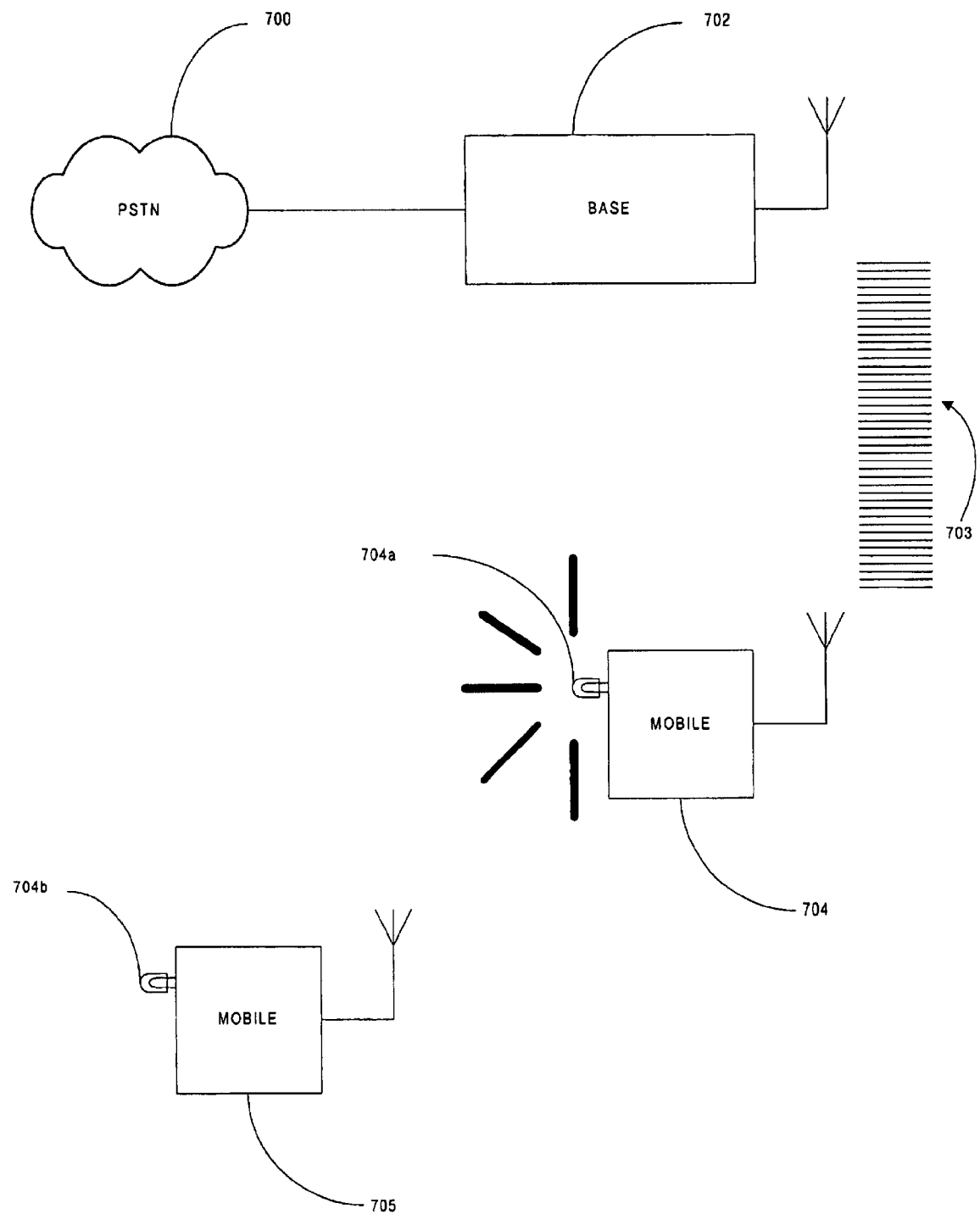

As illustrated in FIG. 10D, the mobile 704, in response to the receipt of the communication from the base 702, activates its indicator 704*a*.

Figure 10E:
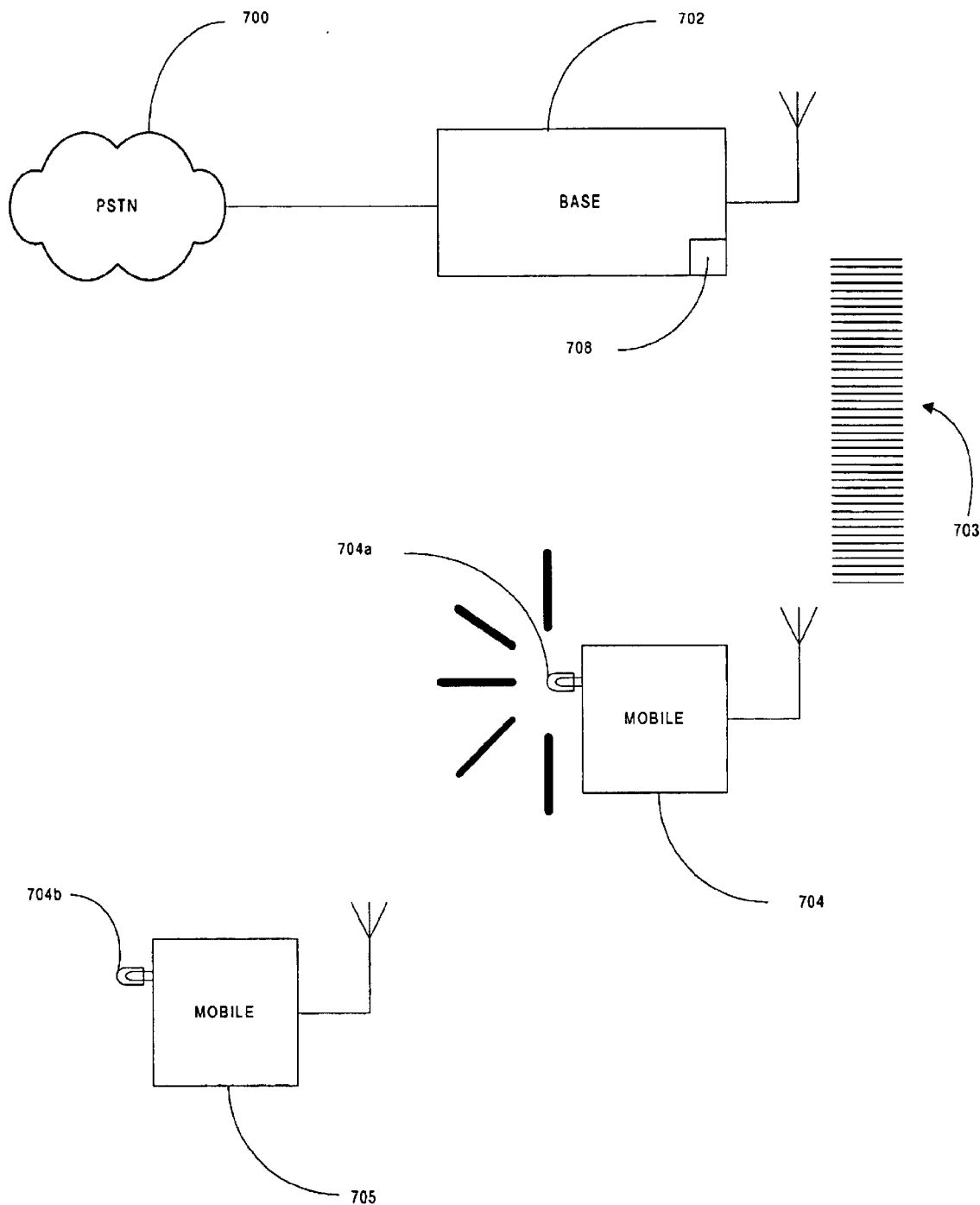

As illustrated in FIG. 10E, the base 702, recognizing that mobile 705 is out of range so that the indicator 704*b* thereof may require updating at some point in the future, stores in buffer 708 the indicator activation command previously sent to mobile 704.

Figure 10F:
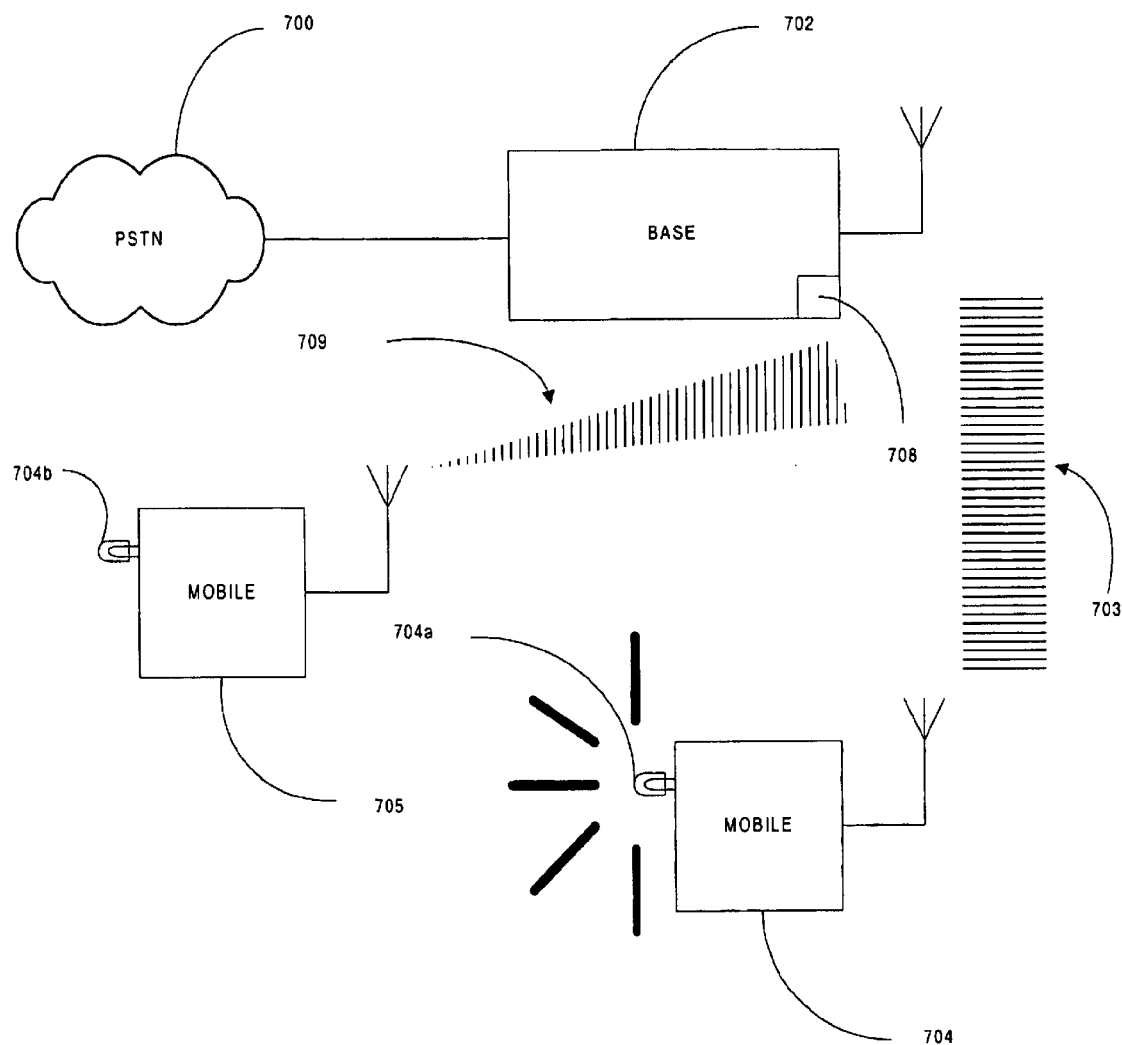

Next, in FIG. 10F, it is assumed that the status of mobile 705 is altered such that it is within range of base 702 or such that its signal is now received by the base. As shown, the mobile 705 transmits a heartbeat signal 709 which is received by the base 702.

In response thereto, the base 702 communicates to the mobile 705 a message, identified by numeral 710, directing the mobile 705 to activate its indicator 704*b*.

Figure 10G:
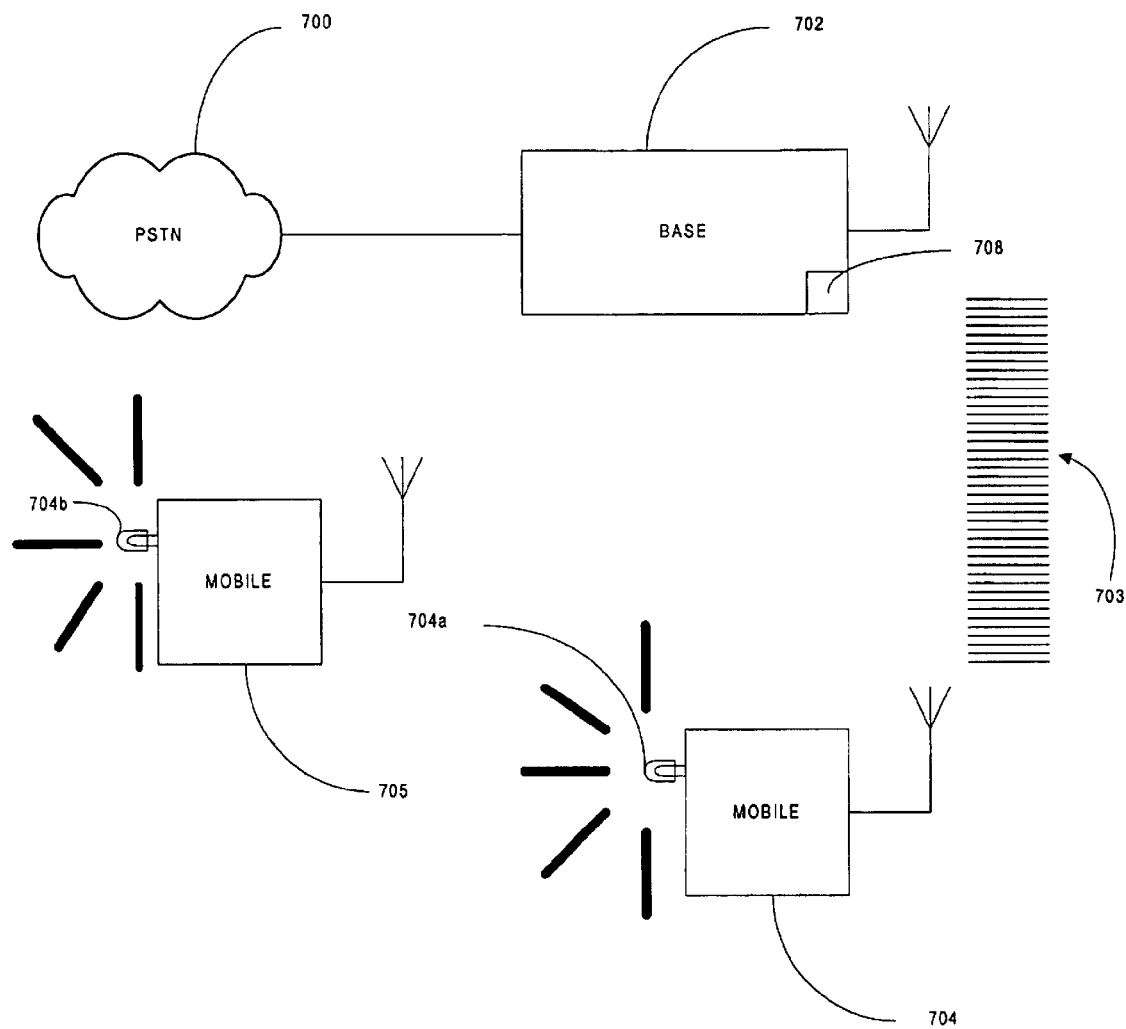
Figure 10H:
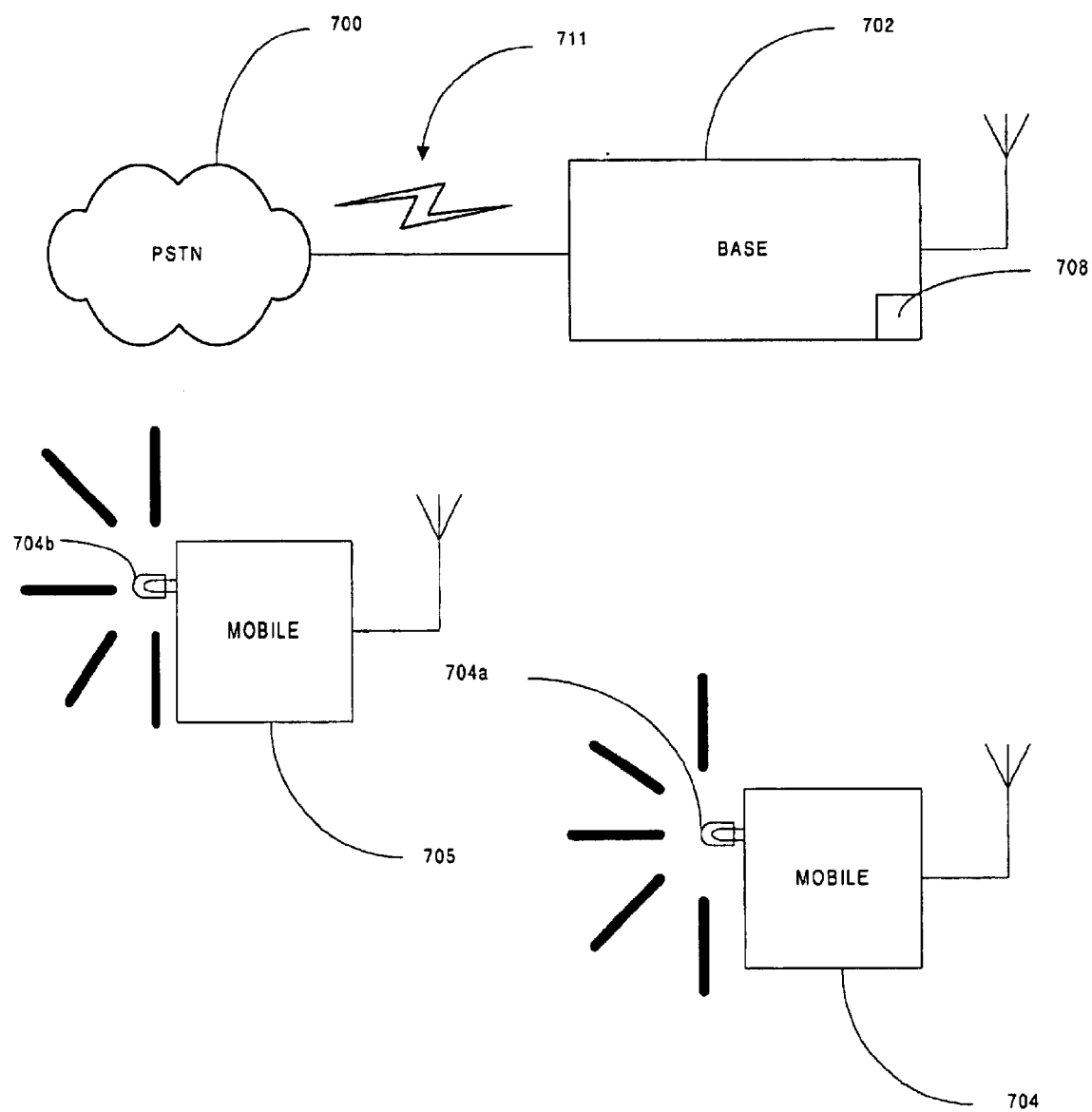
Figure 10I:
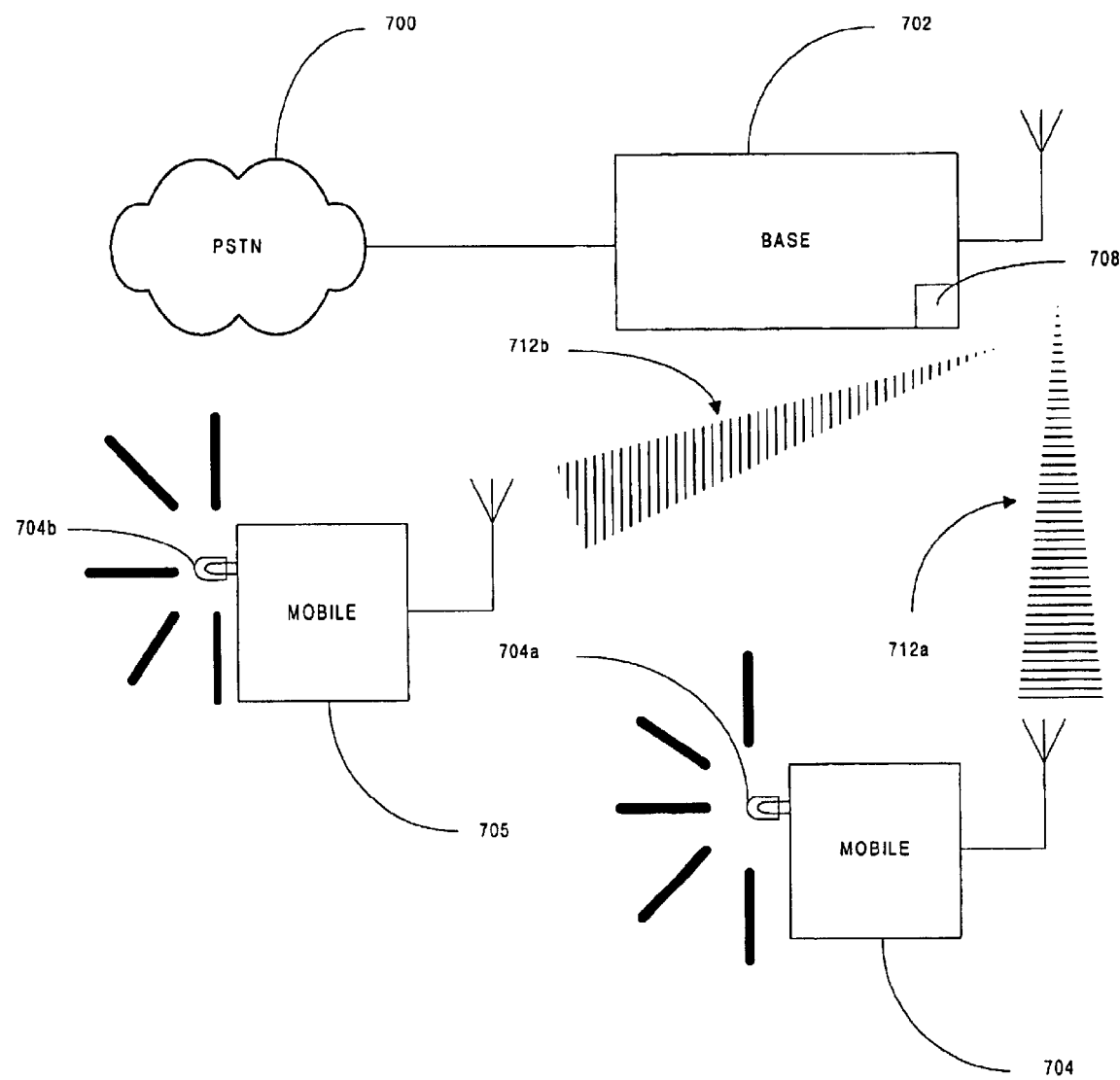

As illustrated in FIG. 10G, mobile 705 then activates its indicator 704*b* in response to the communication received from the base 702.

Next, in step 10H, it is assumed that the pending voice-mail message has been handled. In response to this condition, base 702 receives a message, identified by numeral 711, from the message waiting system on the PSTN advising that the waiting message has been handled.

In response, as illustrated in Figured 10I, the base 702, assuming both mobiles are still within range as indicated by receipt of heartbeat signals from both, transmits communications 712*a* and 712*b* respectively to the mobiles 704, 705 directly both to deactivate their respective indicators 704*a*, 704*b*.

Figure 10J:
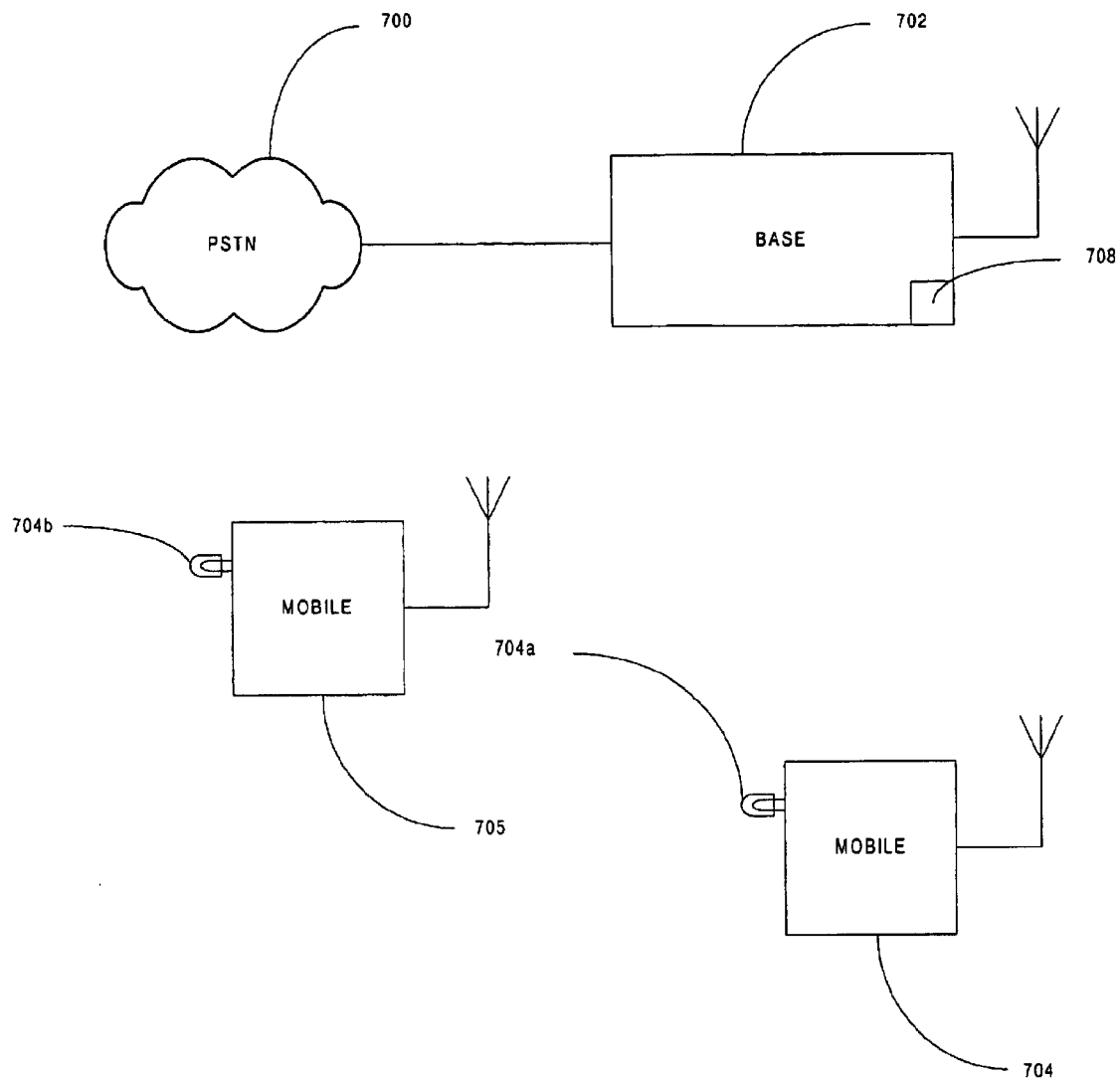

Next, as illustrated in FIG. 10J, both indicators 704*a* and 704*b* are deactivated.

4. Implementation Example of First Embodiment

Figure 2:
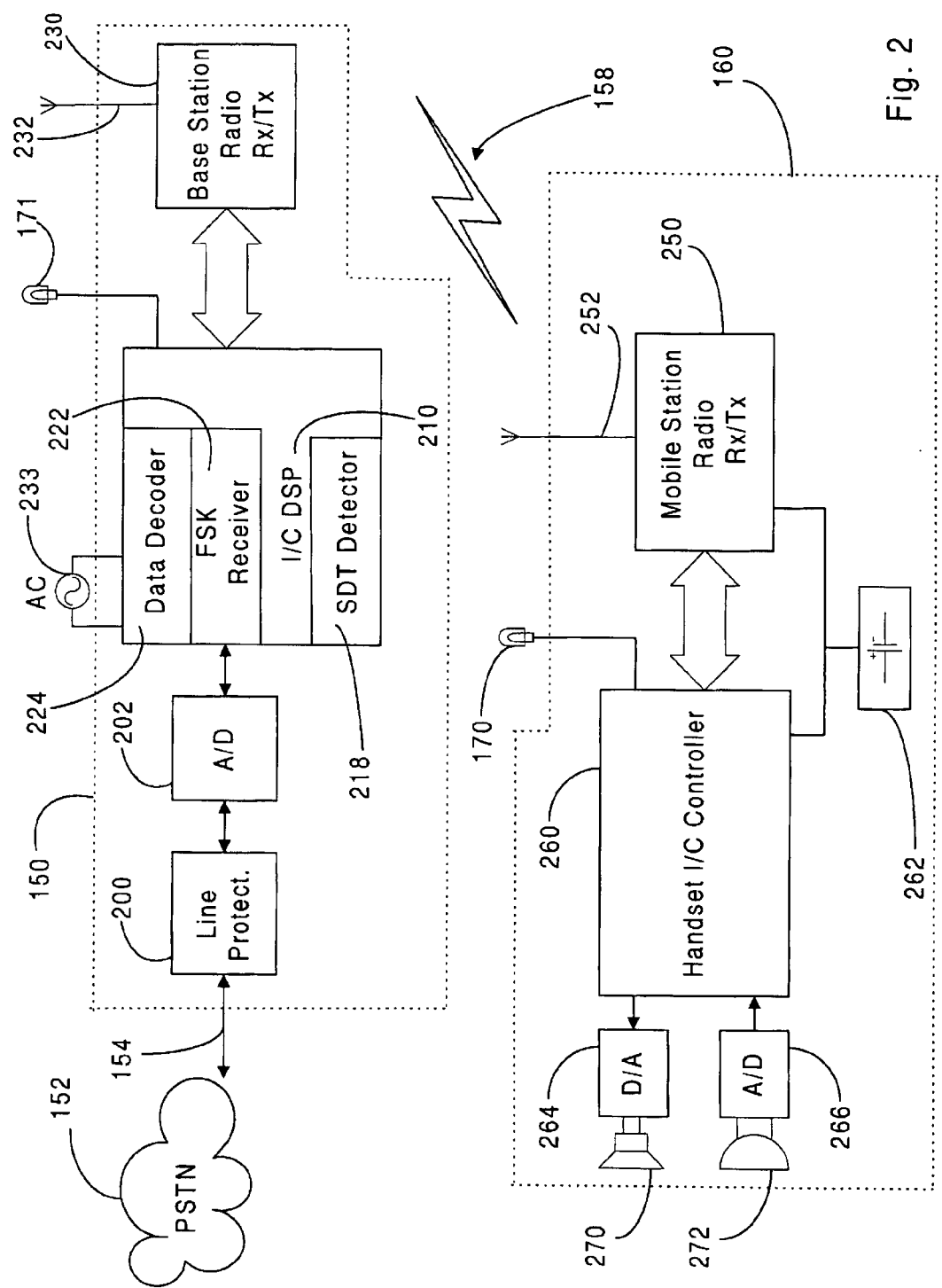
FIG. 2 illustrates a block diagram of a first embodiment of the subject invention.

Referring now to FIG. 2, a block diagram of an implementation example of the first embodiment of the subject invention is shown. The base station 150 connects to the PSTN 152 via line 154. It is contemplated that line 154 be any data exchange mechanism capable of transmitting data or voice including but not limited to copper twisted pair wire, coaxial cable, radio or microwave or other wireless transmission systems, infrared coupling, or other standard conductor capable of transmitting electrical data. The base station 150 is in communication with mobile unit 160 over a wireless interface, as identified with numeral 158.

Base Station

The base station 150 is responsible for detecting the presence of voice mail messages based on signals received from PSTN 152. A standard telephone jack (not shown) interfaces the PSTN line 154 to line protection circuitry 200. The output from line protection circuitry 200 connects to an analog to digital converter (A/D) 202. The output of A/D converter 202 connects to an integrated circuit processor (IC) 210, also sometimes referred to as a digital signal processor (DSP).

The IC 210 includes, among other systems, a stutter dial tone detector 218, a FSK receiver 222, and a data decoder 224 configured to monitor the line for message waiting signals from a central office. The IC 210 also includes buffer memory (not shown) either on chip or accessed via data bus.

Base station indicator 171 connects to IC 210. In one implementation, the indicator 171 is an indicator lamp. In other implementations, message waiting indicators other than a lamp or LED may be utilized, including but not limited to the following type of human perceptible indicators: strobe lights, vibrators, audible tones, beeps, mechanized indicators, smells, images, and tactile sensors.

The IC 210 exchanges information with base station radio transmitter/receiver 230. The transmitter/receiver 230 includes antenna 232 and other appropriate radio communication equipment such as a modulator/demodulator, filter and amplifier. The base station transmitter/receiver 230 transmits information relating to message status over control channel 158.

Control channel 158 is separate and distinct from one or more voice channels used for the communication of voice between the base station 150 and the mobile unit 160. Control channel 158 is capable of supporting communication of control information in parallel with the ongoing communication of voice information between the base unit 150 and mobile unit 160. In one implementation example, the control channel 158 supports communication at generally 900 MHz, although other operating frequencies are possible.

The base station 150 obtains power from an alternating current source 233, such as a wall power receptacle or stand-alone generator.

A stutter dial tone (SDT) detector 218 and a FSK receiver 222 are also included. The SDT detector 218 detects message status by first simulating an off-hook condition, and then monitoring the line 154 for the stutter dial tone signal. If the stutter dial tone is thereafter present, it is determined that a mail message is waiting, while if a stutter dial tone is absent, it is determined that there are no pending mail messages.

The FSK receiver 222 also detects message status by monitoring the telephone line 154 for a VMWI CLASS FSK signal indicating one or more of the following conditions: a new voicemail message, a pending voicemail message, or a recently handled voicemail message. The data decoder 224 decodes FSK messages received by FSK receiver 222.

Although SDT detection and FSK signal monitoring may be utilized individually, the first embodiment adopts both monitoring techniques to create a more robust and flexible system. In addition, as described in U.S. Pat. No. 5,825,852, the two techniques have advantages and disadvantages relative to one another, and a dual mode system such as the present embodiment can take advantage of the beneficial characteristics of both systems. Finally, dual mode coverage ensures that a message notification capability will be available in those instances in which one but not both of stutter dial tone detection and VMWI CLASS detection are available.

Of course, additional known circuitry and functionality is present at the base station 150, such as the circuitry and functionality that concern voice transmission, but only the aspects of the base station that have particular relevance to message waiting notification have been emphasized.

Mobile Unit

The mobile unit 160 includes mobile unit transmitter/receiver 250, antenna 252, and mobile unit controller 260. The controller 260 is in communication with receiver/transmitter 250. The controller 260 electrically connects to indicator 170.

The controller 260 connects to a digital to analog converter 264 that in turn connects to a speaker 270, and to an analog to digital converter 266 that connects to a microphone 272.

In operation, message waiting notification commands are received over the control channel by receiver/transmitter 260, demodulated, and provided to controller 260. Controller 260 implements these commands by ensuring that the indicator 170 is placed in an appropriate state in response to these commands.

In one implementation, the controller 260 also ensures that a periodic heartbeat signal is transmitted by the mobile. At the appropriate time, the controller 260 signals the receiver/transmitter 260 transmit the heartbeat signal over the control channel, and the receiver/transmitter 260, in response thereto, modulates and transmits the heartbeat signal.

The mobile unit 160 obtains power via a power interface 162 connected to a battery 262 as generally powers a mobile communication device.

Figure 3:
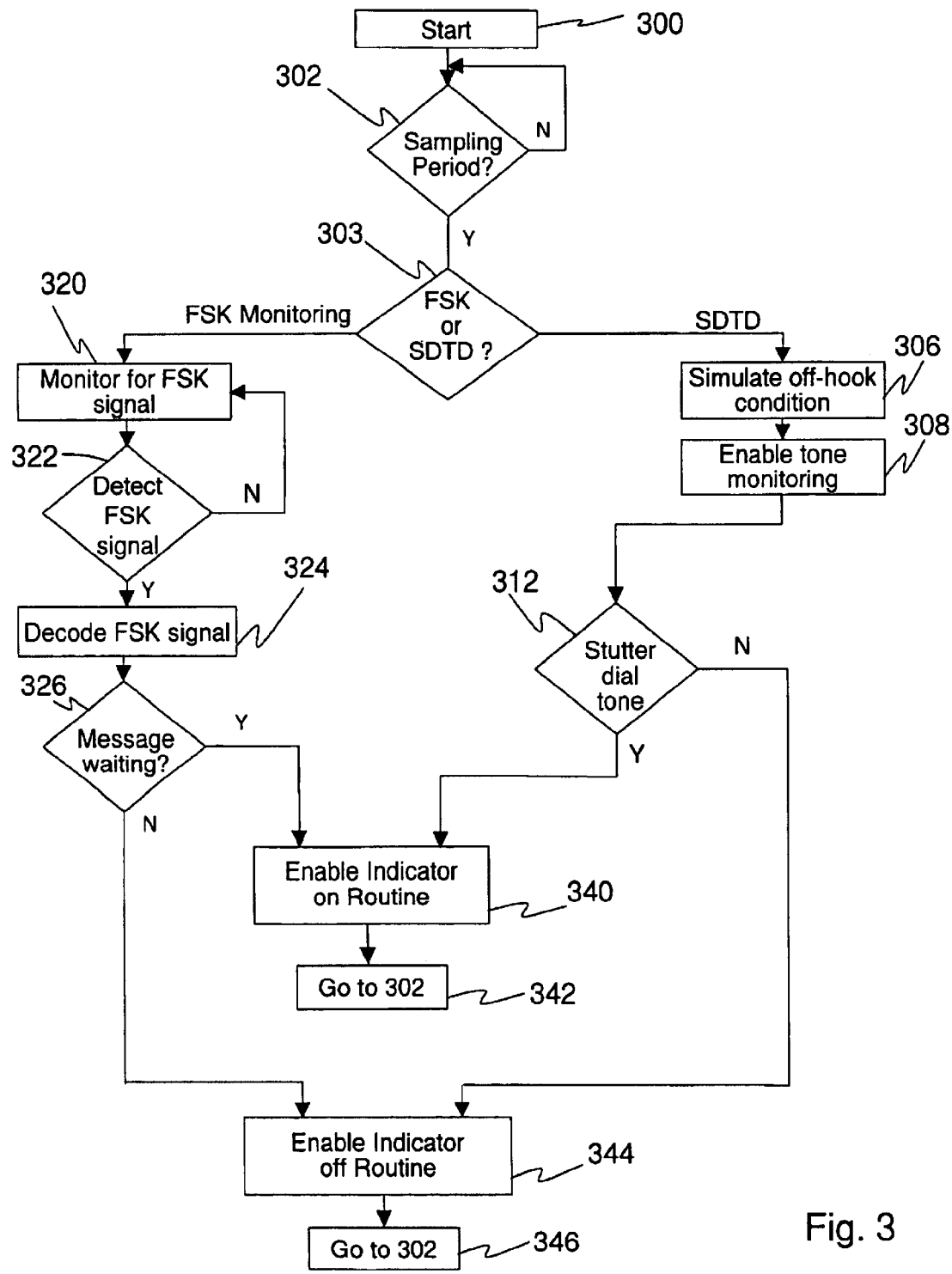
FIG. 3 illustrates an operational flow diagram of a method of operation for the message status detection routine of the subject invention.

Again, it should be appreciated that the mobile unit 160 has other known circuitry and functionality, such as that concerning voice communication, but those aspects that concern message waiting notification have been emphasized in the foregoing discussion since that is what the invention most directly pertains to, 5. Method of Operation Message Status Routine FIG. 3 illustrates an operational flow diagram of one method of operation of the dual mode detection system of the first embodiment.

At a step, 300 the operation starts. Start of the operation may comprise the physical connection of the base unit to the PSTN, or enablement of the voice mail monitoring and detection features of the base station 150. It is contemplated that the subject invention may be employed while voice communication between the base unit and the mobile is ongoing.

At step 302, a determination is made whether the current time is within an appropriate sampling period for line 154. If not, the method loops back to the beginning of step 302. If so, the method determines whether the sampling period is to be used to detect message status through stutter dial tone detection or VMWI CLASS detection. For example, a caller is most likely to leave a voicemail message during an ongoing call, or after an unanswered call. It is thus appropriate to limit the stutter dial tone detection sampling periods to the times just after completion of a call and just after an unanswered call since message status is likely to change during these periods.

If the current time is within an appropriate sampling period, the method jumps to a step 303 determines whether to begin FSK monitoring or stutter dial tone detection (SDTD). If SDTD begins the method jumps to step 306. If FSK monitoring begins the method jumps to step 320. In FIG. 3, steps 306, 308, and 312 concern stutter dial tone detection. Steps 320, 322, 324, 326 concern VMWI CLASS detection.

At step 306, the stuttered dial tone detection system simulates a brief off-hook condition on the telephone line. During the brief moment that the off-hook condition is being simulated, the stutter detection system enables tone monitoring features to determine whether a stutter dial tone is provided from the central office.

If stutter dial tone is not detected, the operation progresses to a step 344 wherein the operation enables the message indicator off routine. The message indicator off routine of this implementation example instructs the controller to deactivate the indicator 171 at the base station (if present). It also causes the radio transmitter of the base station to send a transmission to the mobile unit to deactivate the mobile unit indicator 170.

Next, the operation progresses to a step 346, wherein the operation returns to step 302 to loop until the next appropriate sampling period occurs. Thereafter, the above-described process repeats.

Alternatively, if stutter dial tone detection at step 312 detects a stutter dial tone transmitted from the central office, the operation progresses to a step 340 wherein the circuitry performs an indicator-on routine which in turn activates the message waiting indicator at the base station (if present). A signal is also sent over the control channel to the mobile unit associated with the base station activating the message waiting indicator on the mobile unit. Next, at a step 342 the operation returns to step 302 so that the monitoring process may continue.

At a step 320, the FSK receiver performs FSK signal monitoring for VMWI CLASS-type signals sent from the central office indicating new voice mail messages. In step 322, the operation determines whether an FSK signal is detected. If an FSK signal is not detected, the operation returns to step 320 and the monitoring process continues.

Alternatively if, at step 322, an FSK signal is detected, the operation progresses to a step 324, wherein the FSK receiver 222, in conjunction with the data decoder 224, decodes the incoming FSK signal arriving from the central office. Reception and decoding of FSK signals, and in particular, voice mail message status signals, is known by those of skill in the art.

After the FSK signal is decoded, the operation progresses to a step 326, wherein the integrated circuit 210 determines if the decoded FSK signal indicates a new message in the voice mail system.

Next, the operation progresses to a step 340. At step 340, the operation enables the indicator on routine, which activates the indicator at the base station (if present), and at the mobile unit. In one configuration, conflicts are resolved in this step between message status as determined from VMWI CLASS FSK detection and stutter dial tone detection, such as by giving priority to one technique in relation to the other. Thereafter, at step 342, the operation returns to step 302 to continue monitoring.

Alternatively, if at step 326, the received FSK signal indicates that no messages are on the mail system, the operation progresses to step 344, wherein the indicator off routine is enabled thereby deactivating the indicators 170, 171. This signals that no new or un-retrieved messages are waiting. Thereafter, at a step 346, the operation returns to step 302 to continue the monitoring and updating process.

Of course this is but one of many possible routines or methods for detecting new voice mail messages in a dual detection system. It is fully contemplated that other methods of operation may be adopted either separately or in combination with the operation described in FIG. 3. Furthermore, it is fully contemplated that other mail notification and detection systems will become available or will be developed in the future that are compatible with the subject invention. Likewise, it is contemplated that the subject invention is capable of being implemented in either hardware or software, or a combination thereof.

Mobile Unit Update Routine

Figure 4:
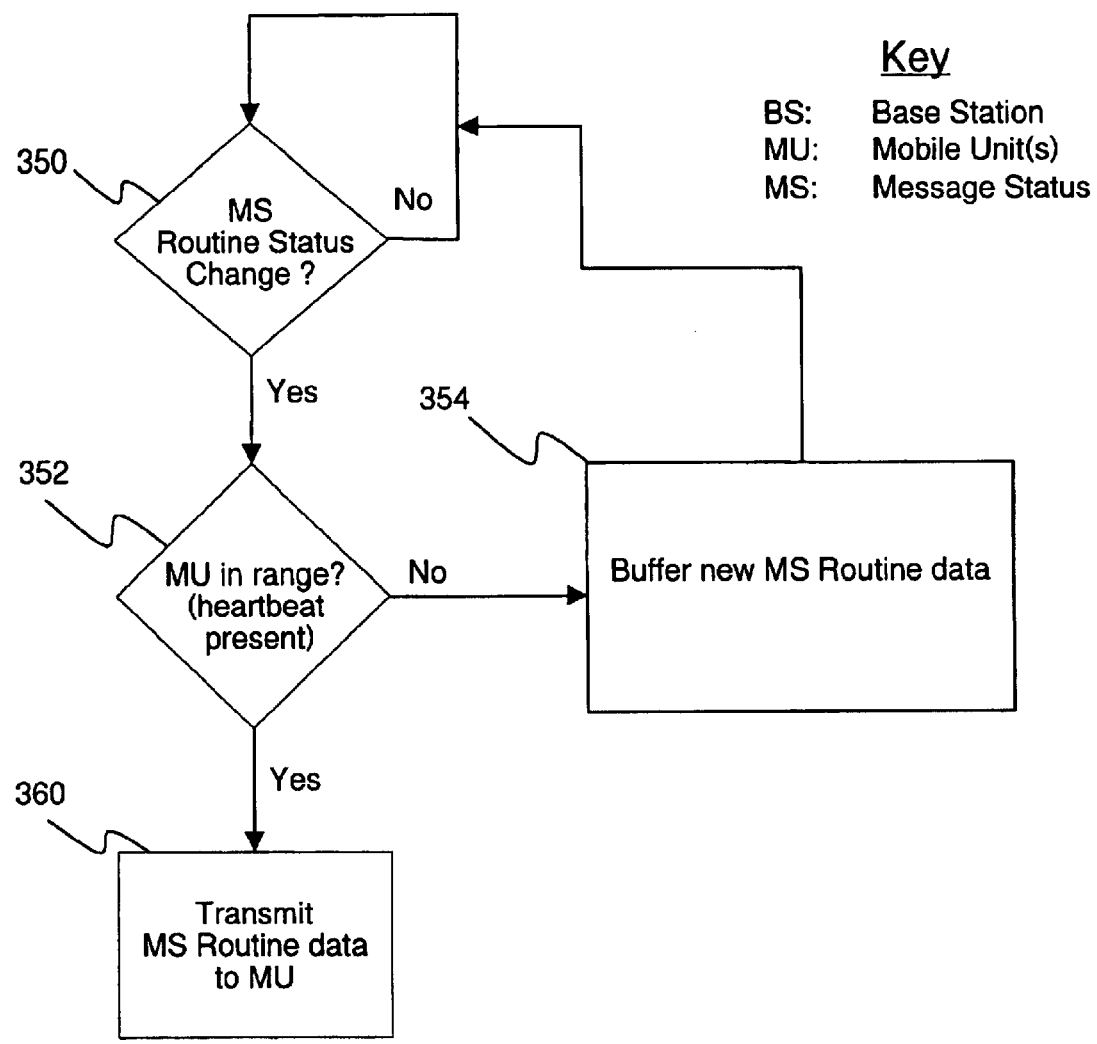
FIG. 4 illustrates an operational flow diagram of a method of operation of a mobile unit update routine of the subject invention.

FIG. 4 illustrates an operational flow diagram of one method of operation of the mobile unit update routine of the implementation example of the first embodiment. This routine monitors the control channel between the mobile unit and the base station. The mobile unit update routine is responsible for updating and storing message status information for the mobile unit.

In a step 350, the message status routine determines if the message detection system has detected a signal from the central office indicating a change in message status. If a new message is not detected, the operation enters into a continuous polling mode thereby returning to a step 350.

If the message status routine indicates a change in message status, the operation progresses to a step 352, wherein the base station detects whether the mobile unit is within communication range of the base or if the control channel quality between the base and the mobile permits data exchange. In one configuration, the mobile continuously or periodically transmits a heart beat signal to the base. If the base station detects the heartbeat signal from the mobile unit, the mobile unit is considered to be within range of the base station for control communication purposes. If the base station does not receive the heartbeat signal from the mobile unit within the prescribed period, then the operation progresses to a step 354. At step 354 the base station buffers in memory the updated status of the message status routine for later transmission to the mobile unit when the heartbeat signal from the mobile unit is detected. If the status is further changed before communication with the mobile unit, the buffered data is updated to reflect the changed status. In this manner, the system automatically handles situations in which the mobile unit is out of range of the base station for extended periods of time. The process then returns to step 350.

Figure 5:
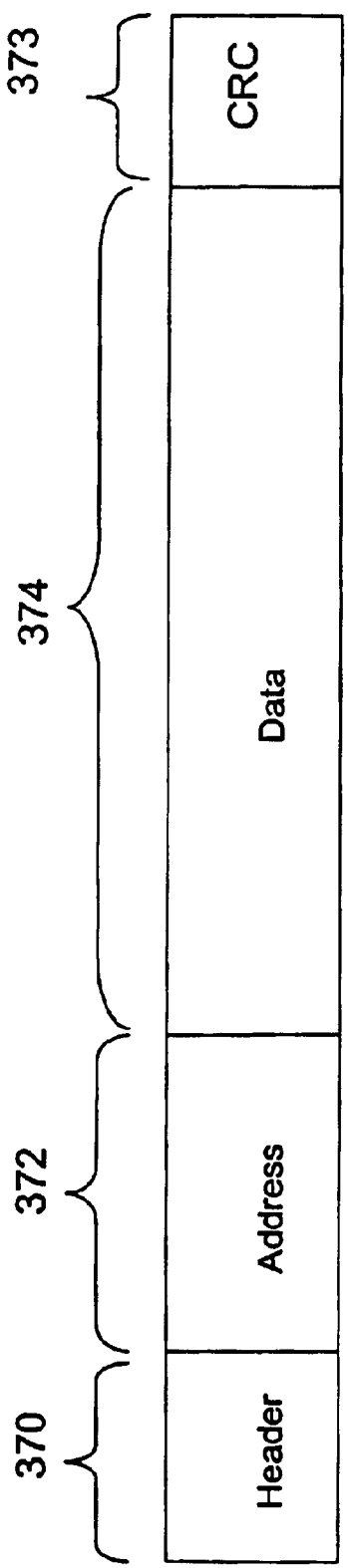
FIG. 5 illustrates an example data packet for use in the subject invention.

It is contemplated that the message status data transmitted from the base station to the mobile unit comprise a packet of data containing a message header, address information and message status data. FIG. 5 illustrates an example of a data packet contemplated for use with the first embodiment to notify the mobile unit of a change in message status.

As shown, a message header 370 identifies the packet type. In this configuration the header indicates that the data packet is a message status update to the mobile unit. Thus, the message header distinguishes the message status data from other types of communication with the mobile unit.

Optional address field 372 is the address of the mobile unit(s) the base station wishes to communicate with. In the current implementation example, it is assumed that the base station is in communication with each of the mobiles it services that are within range. In this case, address field 372 is unnecessary. An application of this field may be explained in relation to the second embodiment.

The data portion 374 of the packet follows the address information 372. The data 374 comprises the status of the message status routine. In this implementation example, such is simply whether or not there is a voice mail message pending. In an alternative configuration, the data could also include more than just the message waiting indicator data, including, but not limited to, the telephone number or name of the caller who left the voice mail, or the time the messages were last checked. Such data could be displayed on a screen or display located on the mobile unit.

Optionally, CRC field 373 is available to provide an error detection and/or correction capability for the data 374.

The data packet structure described above is but one possible configuration for use with the first embodiment described herein. It is fully contemplated that other various configurations of data or methods of sending data besides the use of data packets may be employed and implemented while still operating with the scope of the subject invention.

6. Second Embodiment

Figure 6:
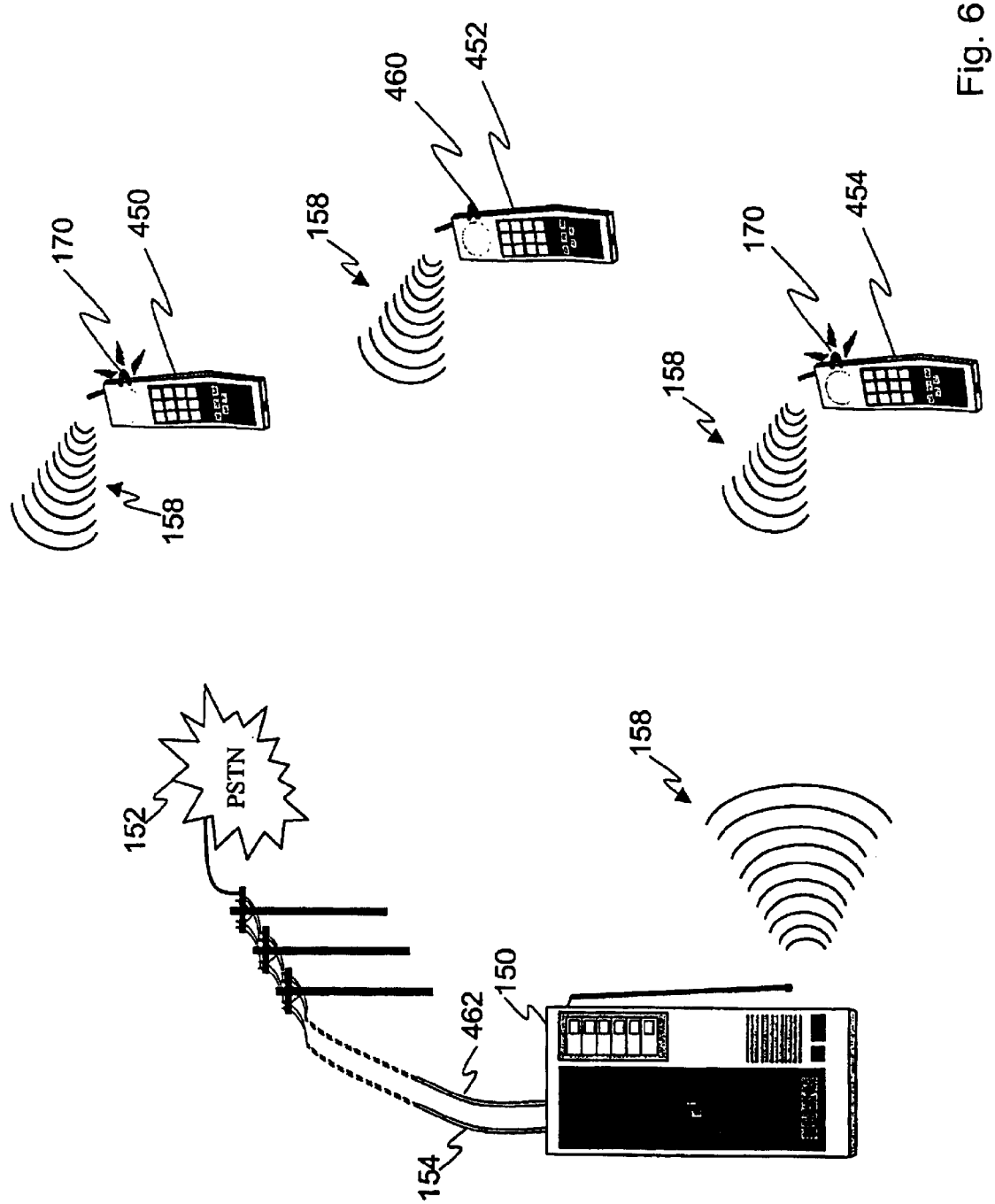
FIG. 6 illustrates a second embodiment of the subject invention.

With reference to FIG. 6, in a second embodiment, each of a plurality of mobile units 450, 452, 454 serviced by the base station 150 is configured with an indicator 170, 460. A messaging system indicates to the base station a message status condition intended only for selected ones of the plurality of mobile units. The base station 150 is configured to address a communication over the control channel to the selected mobile units advising these units to update their indicators to reflect the status condition. In one implementation, messages from the base station 150 over the control channel have address information appended thereto for indicating the selected mobile units to which the communication is intended. The mobile units are each configured to process only those communications received over the control channel that are addressed to that mobile unit, and to ignore other communications over the control channel.

In one implementation, illustrated in FIG. 6, a plurality of mail messaging systems are interfaced to the base station 150, each for saving messages for selected ones of the mobile units serviced by the base station. The base station 150, upon receipt of a communication from one of these mail messaging systems regarding a message status condition, addresses the communication only to the selected mobile units that are the intended recipients of the communication. The status condition is then reflected in the indicators for the selected mobile units, and not for the other mobile units serviced by the base station.

In the implementation illustrated in FIG. 6, base station 150 is connected to a first messaging system over line 154, and a second messaging system over line 462. According to this particular implementation, the first mobile unit 450 and the third mobile unit 454 are associated with the first telephone line 154 while the second mobile unit 452 is associated with the second telephone line 462. Each mobile unit 450, 452, 454 includes circuitry, functionality and indicators as described in the first embodiment.

It should be appreciated, however, that in various configurations 1) each mobile unit may be associated with a single telephone line, 2) two or more mobile units may be associated with a single line while other mobile units are associated with other telephone lines or 3) each mobile unit may be associated with its own unique telephone line. In any of these various configurations the base station includes circuitry for detecting the message status signal from a messaging system maintained at a central office and selectively communicating message status data to the mobile unit associated with the voice mail service.

Upon receipt of a new message on first telephone line 154, the base station 150 notifies the first mobile unit 450 and third mobile unit 454 of the new message. Upon receipt thereof, the first mobile unit 450 and third mobile unit 454 activate their respective indicators 170. In the example illustrated, each of the indicators 158, 170 are flashing LEDs.

In the example illustrated, the voice mail service associated with the second line 462 does not have a message waiting. Accordingly, the base unit 150 that is monitoring the second line 462 does not detect a new message signal, and thus does not instruct the second mobile unit 452 to activate its indicator 460. Accordingly, the message waiting indicator 460 on the second mobile unit 452 does not illuminate or flash.

If either of the first, second, or third mobile unit 450, 452, 454 fall out of range of the base station, the mobile unit update routine, shown in FIG. 4, ensures that the proper status is reflected in the indicator as soon as the mobile is within range.

In one implementation, transmissions from the base station 150 to the mobile units 450, 452, 454 over the control channel takes the form of data packets as shown in FIG. 5. The address field 372 is not optional in this embodiment, but is used to address the data packet to the desired mobile unit or units. Each of mobile units 450, 452, and 454 in turn is configured to only process communications received over the control channel addressed to it.

7. Third Embodiment

In a third embodiment, a base station is in communication with at least one message notification unit over a wireless interface. The message notification unit is configured to communicate with the base station over a control channel only, and is not configured to communicate with the base station over a voice channel. In other words, the unit is capable of communicating control information only with the base station, and is not capable of communicating voice information with the base station.

The message notification unit is configured with an indicator for indicating the status of a mail message condition. The base station receives from the mail messaging system a communication indicating the status, or a change in status, of a mail message condition. The base station communicates this information to the message notification unit over the control channel. In response thereto, the message notification unit places or ensure placement of the indicator in the proper state to indicate the current message waiting status.

Message notification units have the advantages of portability and low cost of manufacture in relation to a mobile unit configured with voice communication capabilities.

In an example environment, it is contemplated that a plurality of message notification units be selectively located in a residence or place of business to provide notification of voice mail messages.

Figure 7:
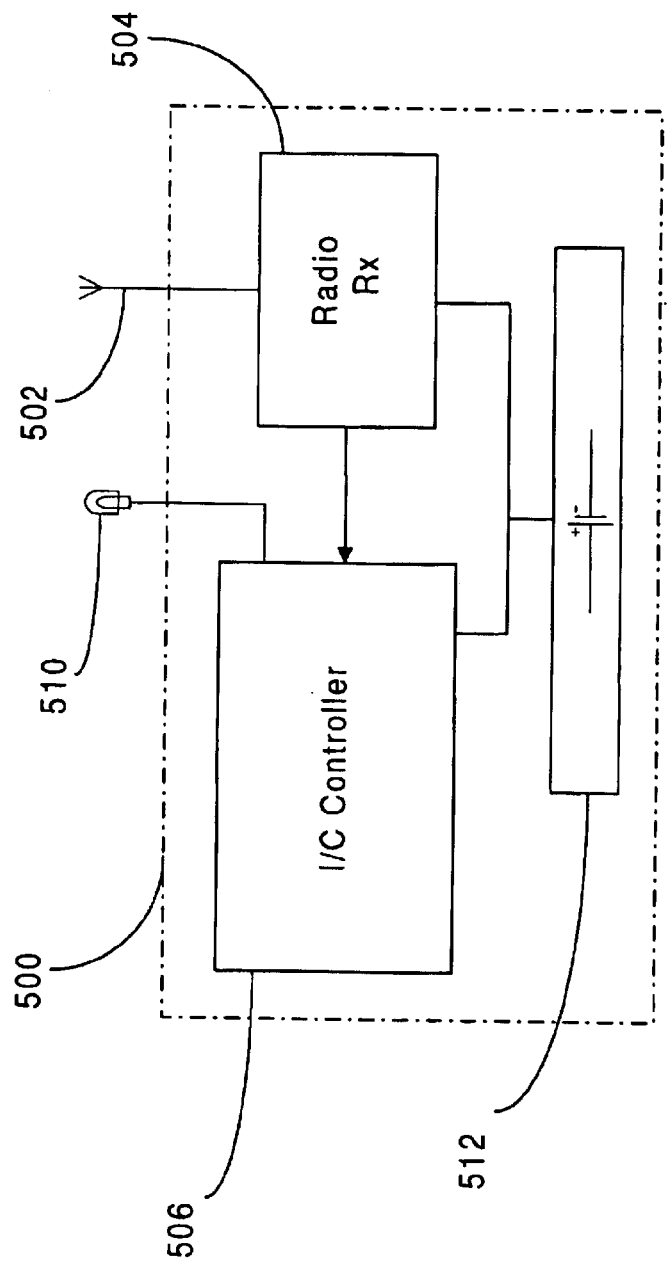
FIG. 7 illustrates a third embodiment of the subject invention

FIG. 7 illustrates a block diagram of a message notification unit 500 of the third embodiment. An antenna 502 configured to receive message status data from a base station (not shown in FIG. 7) connects to a receiver 504. The radio receiver 504 contains appropriate demodulation, filtering and amplification systems as known by those of skill in the art.

A controller 506 receives the demodulated input from the radio receiver 504. After performing decoding of the received signal, the controller selectively activates message indicator 510 based on message status data from the base station or other transmitting unit.

Power supply interface 512 supplies power to controller 506 and receiver 504. In one preferred configuration, the power supply interface 512 connects to one or more batteries, although in other configurations, the power supply interface may comprise a hard wired connection to a local power source such as telephone lines, AC power lines, doorbell power supply lines, furnace power supply lines, or solar cells.

In operation, a base station transmits message status data via wireless transmission to one or more message notification units 500 selectively placed at areas convenient for message notification and within transmission range of the base station (not shown in FIG. 7). Upon detection of a change in message status from the central office, the base station transmits a signal to one or more of the message notification units via radio communication or other form of wireless communication.

Upon receipt of the change in message status signal from the base station, the one or more message notification units 500 evaluate the data from the base station, and modify the status of the message indicator 510 accordingly. For example, if the indicator is not activated, and the message indicator unit 500 receives and decodes a message from the base station indicating a new voice mail message has arrived, the message indicator unit activates the indicator 510 to notify those in human perceptible range of the unit of the new message. In one implementation, the indicator is a LED. Other message waiting indicators are possible, including screen displays, audible tones, bells, beeps, tics, mechanical indicators, and the like.

Figure 8:
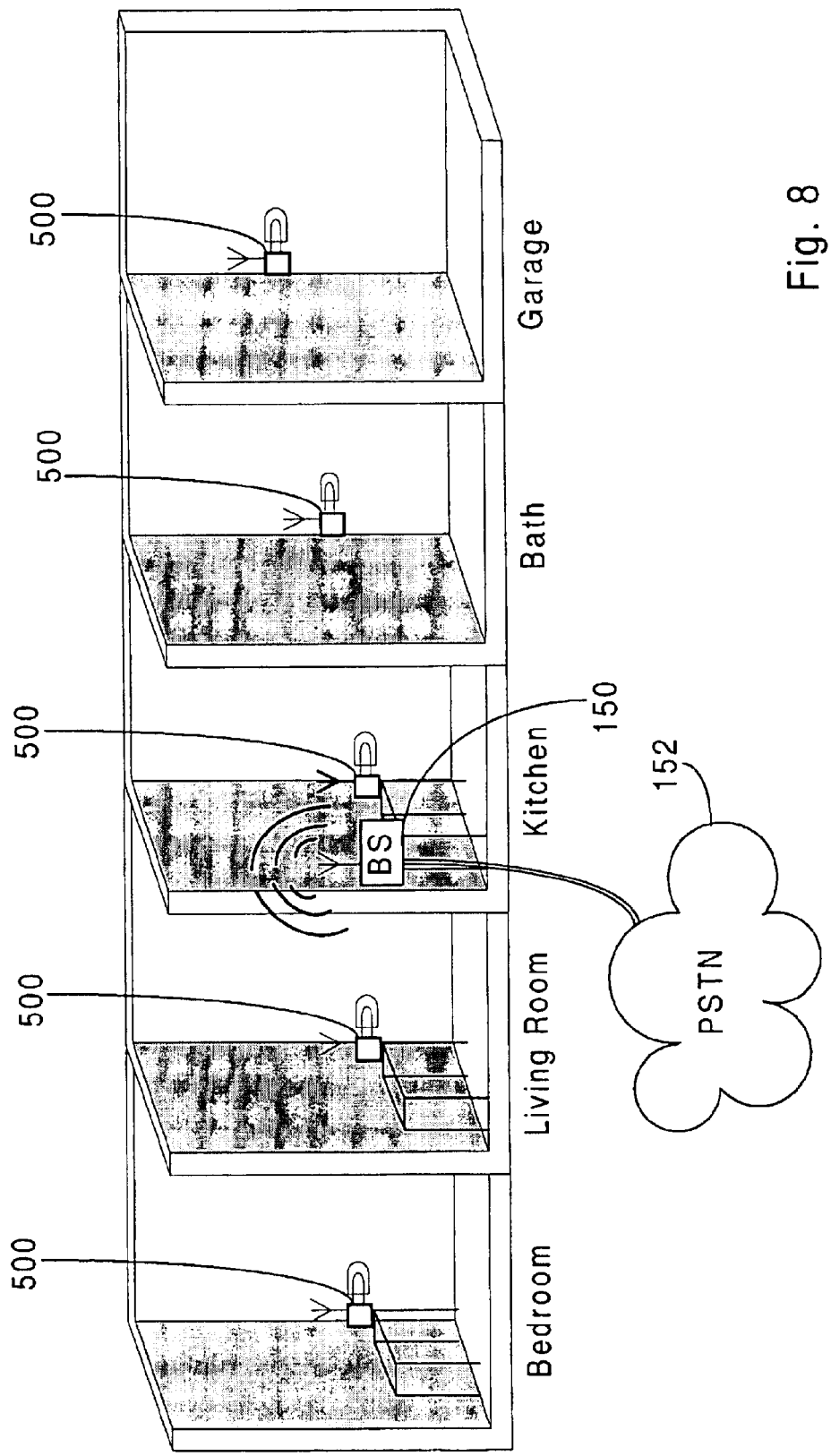
FIG. 8 illustrates an example environment of the third embodiment of the subject invention.

FIG. 8 illustrates a perspective cut-away view of an example environment of use for the message indicator unit 500. For ease of explanation, a common household arrangement is chosen having a garage, bathroom, kitchen, living area and a bedroom. In each room, a message indicator unit 500 is conveniently located. A base station 150 connects to the PSTN and monitors the telephone line for either of stutter dial tone or FSK signals from the central office. Upon detection of a change in message status, the base station 150 transmits to the message notification units 500 data signals via radio or other frequency communication. Each of the one or more message indicator units 500 receives this signal via an antenna or other signal reception device and evaluates the message status data. The message indicator unit activates its respective indicator 502 if an un-retrieved message is waiting. It is contemplated that an outdoor model capable of withstanding temperate changes and conditions be implemented for use on a patio or garden.

Placing one or more message indicator units in one or more various locations in a residence or business provides several advantages. First, each message waiting indicator is less costly than a mobile unit because it lacks the telephone communication circuitry, keypad, speaker and microphone of a cordless handset.

Another advantage of a message notification unit 500 is the ease and portability of installation since each unit is a self contained and, no wiring or connection is required. Thus, they may be placed anywhere within a structure and quickly moved from site to site depending on a particular need. Battery operation further extends the number of possible placement locations.

Yet another advantage of the message indicator unit of the third embodiment is that it may be made compatible with the plurality of different base stations or mobile units. For example, it is fully contemplated that each message notification unit 500 may include a user selectable channel or code so that a base station may selectively communicate data to particular individual message notification units in a system having a plurality of notification units. In use, a signal is transmitted from the base station accompanied by an assigned code. Although the signal is received by all message notification units within range, only those message notification units identified with the associated code act on the received message status data.

In another configuration, the message notification unit 500 includes a plurality of indicator lights, each corresponding to a voice mail service or subscriber line. When a voice mail service or subscriber line has a message waiting, the particular light corresponding to that service or line is controlled to periodically illuminate or flash. Thus each light operates independent of the other lights on the message indicator unit.

While particular embodiments and examples of the present invention have been described above, it should be understood that they have been presented by way of example only and not as limitations. Those of ordinary skill in the art will readily appreciate that other various embodiments or configurations adopting the principles of the subject invention are possible. The breadth and scope of the present invention is defined by the following claims and their equivalents, and is not limited by the particular embodiments and implementations described herein.

What is claimed is:

1. A message notification unit configured to communicate control information over a wireless interface to a base station, the base station configured to communicate with a messaging system regarding a message status for the message notification unit, the message notification unit comprising:

an indicator having first and second human perceptible states to indicate the message status, the first state for indicating a no message waiting condition, and the second state for indicating a message waiting condition;

a receiver configured to receive, over the wireless interface, a message signal from the base station containing information regarding the message status;

a controller configured to maintain or change the state of the indicator to reflect the message status based on the message signal; and a transmitter configured to transmit a range signal to the base station periodically;

wherein receipt of the range signal by the base station is an indication to the base station that the message notification unit is within a proper range to receive the message signal from the base station.

2. The message notification unit of claim 1, wherein the message notification unit has a message notification unit address, and wherein the message signal includes a message signal address.

3. The message notification unit of claim 1, wherein the base station is in communication with the message system via a telephone line, and wherein the message status indicates the message waiting condition if the base station receives a stuttering dial tone or a VMWI FSK signal.

4. A message notification method for use by a message notification unit configured to communicate with a base station over a wireless interface, the base station configured to communicate with a messaging system regarding a message status for the message notification unit, the message notification method comprising:

transmitting a range signal to the base station periodically, wherein receipt of the range signal by the base station is an indication to the base station that the message notification unit is within a proper range to receive a message signal from the base station;

receiving, over the wireless interface, the message signal from a base station containing information regarding the message status; and indicating a no message waiting condition and a message waiting condition based on the message signal in human perceptible states to indicate the message status.

5. The message notification method of claim 4, wherein the message notification unit has a message notification unit address, and wherein the message signal includes a message signal address.

6. The message notification method of claim 4, wherein the base station is in communication with the message system via a telephone line, and wherein the message status indicates the message waiting condition if the base station receives a stuttering dial tone or a VMWI FSK signal.

7. A mobile station configured to receive a message waiting notification from a base station, the base station being in communication with a messaging system over a communication line, the base station including a message waiting detector, wherein the message waiting detector indicates a message waiting if the message waiting detector detects either a stuttering dial tone over the communication line or a VMWI FSK signal, the mobile station comprising:

an indicator having first and second human perceptible states, the first state for indicating a no message waiting condition and the second state for indicating a message waiting condition;

a receiver configured to receive, over the wireless interface, a message signal from the base station, the message signal indicative of one of the no message waiting condition and the message waiting condition;

a controller configured to maintain or change the state of the indicator based on the message signal; and a transmitter configured to transmit a range signal to the base station periodically;

wherein receipt of the range signal by the base station is an indication to the base station that the mobile station is within a proper range to receive the message signal from the base station.

8. The mobile station of claim 7, wherein the mobile station has a mobile station address, and wherein the message signal includes a message signal address.

* * * * *